United States Patent
Chen et al.

(10) Patent No.: US 10,707,989 B2
(45) Date of Patent: Jul. 7, 2020

(54) METHOD AND DEVICE IN USER EQUIPMENT AND BASE STATION FOR CHANNEL CODING IN TRANSMISSION FOR WIRELESS COMMUNICATION

(71) Applicant: Shanghai Langbo Communication Technology Company Limited, Shanghai (CN)

(72) Inventors: Jin-Hui Chen, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 21 days.

(21) Appl. No.: 16/179,569

(22) Filed: Nov. 2, 2018

(65) Prior Publication Data

US 2019/0140767 A1    May 9, 2019

(30) Foreign Application Priority Data

Nov. 4, 2017    (CN) .......................... 2017 1 1073250

(51) Int. Cl.
*H04L 1/00*    (2006.01)
*H04L 5/00*    (2006.01)

(52) U.S. Cl.
CPC .......... *H04L 1/0009* (2013.01); *H04L 1/0041* (2013.01); *H04L 1/0057* (2013.01); *H04L 1/0072* (2013.01); *H04L 5/0046* (2013.01); *H04L 1/0061* (2013.01)

(58) Field of Classification Search
CPC ... H04L 1/0009; H04L 1/0041; H04L 1/0057; H04L 1/0072
See application file for complete search history.

(56) References Cited

U.S. PATENT DOCUMENTS

| 10,547,330 | B2* | 1/2020 | Chen | H03M 13/09 |
| 2015/0249473 | A1* | 9/2015 | Li | H03M 13/2957 |
| | | | | 341/51 |
| 2018/0026663 | A1* | 1/2018 | Wu | H03M 13/6362 |
| | | | | 714/776 |
| 2018/0367251 | A1* | 12/2018 | Zhou | H03M 13/6525 |
| 2019/0097756 | A1* | 3/2019 | Chatterjee | H04L 1/0061 |

* cited by examiner

*Primary Examiner* — Walli Z Butt
*Assistant Examiner* — Ryan C Kavleski
(74) *Attorney, Agent, or Firm* — Maschoff Brennan

(57) ABSTRACT

The present disclosure discloses a method and device in user equipment and a base station for wireless communication. The base station equipment sequentially generates a first information block, performs first channel coding and transmits a first radio signal, wherein the first information block includes bits in a first sub-information block and padding bits, the first information block is used to generate a first check bit block, the first information block and the first check bit block are interleaved to generate the first bit block, and the first bit block is used as the input of the first channel coding; the bits in the first sub-information block are discontinuous in the first information block, or the padding bits are discontinuous in the first information block.

16 Claims, 9 Drawing Sheets

METHOD AND DEVICE IN USER EQUIPMENT AND BASE STATION FOR CHANNEL CODING IN TRANSMISSION FOR WIRELESS COMMUNICATION

CROSS REFERENCE TO RELATED APPLICATION

This application claims the priority benefit of Chinese Patent Application Serial Number 201711073250.8, filed on Nov. 4, 2017, the full disclosure of which is incorporated herein by reference.

BACKGROUND

Technical Field

The present disclosure relates to a method for transmitting radio signals in a wireless communication system, and in particular to a method and device for channel coding in transmission.

Related Art

Polar Codes are coding schemes first proposed by Professor Erdal Arikan from University of Birken in Turkey in 2008, which may realize the code construction method of the capacity of a symmetrical Binary input Discrete Memoryless Channel (B-DMC). At the 3rd Generation Partner Project (3GPP) RAN1#87 conference, the 3GPP determined the use of a Polar code scheme as a control channel coding scheme of the 5G Enhanced Mobile Broadband (eMBB) scenario, and the use of a distributed Cyclic Redundancy Check (CRC) as an input of the polar code module to achieve the purpose of ending decoding as early as possible in the presence of a decoding error.

In the traditional Long Term Evolution (LTE) system, a Downlink Control Information (DCI) format includes a plurality of fields for different control content, and the bits of each field are continuous in one DCI. Different Downlink Control Information (DCI) formats correspond to different numbers of coded bits. User Equipment (UE) performs blind detection on the Physical Downlink Control Channel (PDCCH) carrying the DCI according to all possible DCI formats corresponding to the current transmission mode.

SUMMARY

The inventors found through researches that according to an interleaving table of a distributed CRC in the discussion of 3GPP New Radio (NR), two adjacent bits in one DCI are interleaved to obtain two bits which may be not adjacent in the bit block, and the bits in the bit block obtained by interleaving are sequentially arranged in an ascending order of the reliability coefficients corresponding to the subchannels of the polar code. Therefore, if a segment of bits with continuous positions is selected from the interleaved bit block as a control field in order to optimize the decoding performance, the interleaved bits in the control field in the DCI may be discontinuous.

In view of the above problem, the present disclosure provides a scheme. It should be noted that, in the case of no conflict, the embodiments of the present disclosure and the features in the embodiments may be combined with each other arbitrarily. For example, embodiments in the base station of the present disclosure and the features in the embodiments may be applied to user equipment, and vice versa.

The present disclosure discloses a method in base station equipment for wireless communication, including:

generating a first information block, wherein the first information block consists of bits in M sub-information blocks and Q padding bits, where the M is a positive integer greater than one, and the Q is a non-negative positive integer;

performing first channel coding, wherein the first channel coding is based on a polar code, a first bit block is used for an input of the first channel coding, the first information block and the first check bit block are interleaved to generate the first bit block, and the first information block is used to generate the first check bit block; and transmitting a first radio signal, wherein the output of the first channel coding is used to generate the first radio signal;

wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the above method has the advantage of optimizing the distribution of the bits in the sub-information blocks or padding bits on the sub-channels corresponding to the polar code using the discontinuity of the bits in the sub-information blocks or padding bits to improve the decoding performance.

In one embodiment, the first information block is broadcast information.

In one embodiment, the first information block is a Downlink Control Information (DCI).

In one embodiment, the first information block is a Downlink Control Information (DCI) related to uplink transmission.

In one embodiment, the first information block is a Downlink Control Information (DCI) related to downlink transmission.

In one embodiment, the first information block is a DCI related to the UL Grant.

In one embodiment, the first information block indicates control information related to uplink transmission.

In one embodiment, the first information block indicates a time-frequency resource for uplink transmission.

In one embodiment, the first information block indicates a modulation scheme for uplink transmission.

In one embodiment, the first information block indicates a coding scheme for uplink transmission.

In one embodiment, the first information indicates a multi-antenna technical scheme for uplink transmission.

In one embodiment, the first information block is a DCI related to the DL Grant.

In one embodiment, the first information block indicates control information related to downlink transmission.

In one embodiment, the first information block indicates a time-frequency resource for downlink transmission.

In one embodiment, the first information block indicates a modulation scheme for downlink transmission.

In one embodiment, the first information block indicates a coding scheme for downlink transmission.

In one embodiment, the first information block indicates a multi-antenna technical scheme for downlink transmission.

In one embodiment, the M sub-information blocks correspond to M fields in a DCI, respectively.

In one embodiment, the M sub-information blocks correspond to M fields in one piece of broadcast information, respectively.

In one embodiment, the M sub-information blocks correspond to M control objects, respectively.

In one embodiment, the first information block is used to determine M values corresponding to the M sub-information blocks, respectively.

In one embodiment, the M sub-information blocks are used to calculate M values, respectively.

In one embodiment, the values of the M sub-information blocks indicate the status of M control objects, respectively.

In one embodiment, the fourth sub-information block and the fifth sub-information block are two sub-information blocks in the M sub-information blocks, the value of the fourth sub-information block indicates a modulation coding scheme, and the value of the fifth sub-information block indicates the time-frequency resource occupied for transmission.

In one embodiment, the fourth sub-information block and the fifth sub-information block are two sub-information blocks in the M sub-information blocks, the value of the fourth sub-information block indicates a modulation coding scheme, and the value of the fifth sub-information block indicates a multi-antenna technical scheme.

In one embodiment, the first information block does not include a check bit.

In one embodiment, the check bit is a parity bit.

In one embodiment, the check bit is a bit in a CRC bit block.

In one embodiment, the check bit is used to determine whether the decoding is correct during the decoding process.

In one embodiment, the Q is 0, and the first information block consists of the M sub-information blocks.

In one embodiment, the Q is greater than 0, and the values of the Q padding bits are set by default.

In one embodiment, the Q is greater than 0, and the values of the Q padding bits are all fixed to zero.

In one embodiment, the Q is greater than 0, and the values of the Q padding bits are set by default to be the same as the value of the frozen bit.

In one embodiment, the Q is equal to the number of bits in the first information block minus the total number of bits in the M sub-information blocks.

In one embodiment, the Q ensures that the number of bits in the first information block is a target positive integer in the first candidate integer set, the target positive integer is a minimum positive integer not less than the total number of bits in the M sub-information blocks in the first candidate integer set, and the first candidate integer set consists of a plurality of positive integers.

In one embodiment, the first candidate integer set is default (i.e., no signaling configuration is required).

In one embodiment, any positive integer in the first candidate integer set is no more than 200.

In one embodiment, the first information block does not include padding bits other than the Q padding bits.

In one embodiment, the first information block is a bit block obtained by interleaving one DCI.

In one embodiment, the first information block is a bit block obtained by interleaving the second information block.

In one embodiment, the second information block is a bit block obtained by sequentially cascading the M information blocks and the Q padding bits.

In one embodiment, the second information block is a bit block obtained by sequentially cascading the Q padding bits and the M information blocks.

In one embodiment, the M sub-information blocks are M fields in the second information block, respectively.

In one embodiment, the position of a bit in a bit block refers to the sequence number of the bit position in which the bit is located in the bit block, the sequence number is used to determine the object of the subsequent operation, and the bit position with a smaller sequence number is closer to the front in the bit block.

In one embodiment, the output of the polar code is obtained by multiplying an input bit block of length N by a Kronecker matrix having N rows and N columns, where the N is the nth power of 2, and the n is a positive integer. One bit position in the input bit block is referred to as a subchannel, and the subchannel has the same sequence number as the Kronecker matrix.

In one embodiment, the input bit block includes a frozen bit.

In one embodiment, the input bit block consists of all bits in the first information block, all bits in the first check bit block, and frozen bits.

In one embodiment, the frozen bit block and the first bit block are sequentially cascaded to generate the fourth bit block of length N, the bits in the fourth bit block are arranged in an ascending order of reliability coefficients, the positions of the bits in the fourth bit block are in one-to-one correspondence with N reliability coefficients, respectively, the N reliability coefficients are in one-to-one correspondence with the sequence numbers of the N subchannels, respectively, the bits in the fourth bit block are placed on the subchannel corresponding to their position, the bits on the N subchannels are arranged in an ascending order of the sequence numbers of the N subchannels to form a fifth bit block, and the fifth bit block is multiplied by a Kronecker Matrix having N rows and N columns used by the polar code to obtain the output of the polar code, where the N is the nth power of 2, and the n is a positive integer.

In one embodiment, serial decoding is used to decode the polar code.

In one embodiment, the serial decoding means that the decoder sequentially decodes the bits in one bit string and uses the bits decoded early for later decoding.

In one embodiment, the sequential order in which the bits in the first information block are in the first information block is different from the sequential order in which the bits in the first information block are in the first bit block.

In one embodiment, at least two continuous bits in the first information block are distributed (i.e., discontinuous) in the first bit block.

In one embodiment, the first bit block is a result of reordering bits in the first information block and bits in the first check bit block.

In one embodiment, the first bit block is a result of mixing and reordering bits in the first information block, the L check bits and frozen bits.

In one embodiment, the bits in the first bit block are sequentially arranged in an ascending order of their corresponding reliability coefficients, and the reliability coefficients corresponding to the top bits are smaller.

In one embodiment, the reliability coefficients are in one-to-one correspondence with the sequential order of the subchannels.

In one embodiment, the reliability coefficient refers to the reliability of a subchannel used to transmit the bit. The value of the reliability is related to the composition of the polar code.

In one embodiment, the first bit blocks are arranged in an ascending order of the decoding sequence number corresponding to each bit position assumed by the base station equipment, and the first bit block which is decoded earlier is closer to the front.

In one embodiment, the first bit block includes frozen bits, and the bits in the frozen bit block are the bits whose positions are front-most in the first bit block.

In one embodiment, the value of the frozen bit is determined by default.

In one embodiment, the frozen bi is used as known bits in the decoding process.

In one embodiment, the first bit block includes frozen bits, and a position of one bit in the first bit block corresponds to a subchannel in one polar code.

In one embodiment, the first bit block includes frozen bits, the first bit block is used as an input of the polar code, and one bit position in the first bit block corresponds to a row in the Kronecker matrix.

In one embodiment, the first bit block does not include frozen bits, the first bit block is used to generate a fourth bit block, and the fourth bit block includes frozen bits.

In one embodiment, a frozen bit block and the first bit block are sequentially cascaded to obtain a fourth bit block.

In one embodiment, the bits in the fourth bit block are sequentially arranged in an ascending order of their corresponding reliability coefficients, and the reliability coefficients corresponding to the top bits are smaller.

In one embodiment, the bits in the fourth bit block are in one-to-one correspondence with the subchannels.

In one embodiment, the bits in the fourth bit block are reordered according to the sequence number of their corresponding subchannels to generate a fifth bit block. The fifth bit block is used as an input bit block of the polar code.

In one embodiment, the fourth bit block is used as an input bit block of the polar code.

In one embodiment, the bits in the third bit block are sequentially mapped into the first bit block after being interleaved, and the third bit block is the result of sequentially cascading the first information block and the first check bit block.

In one embodiment, a first interleaving table is used to interleave the third bit block to generate the first bit block.

In one embodiment, the first interleaving table is determined by default.

In one embodiment, the first interleaving table is preferable.

In one embodiment, the first interleaving table differs according to the number of bits in the first information block.

In one embodiment, the first interleaving table is one of P1 candidate interleaving tables, and the number of bits in the first information block is used to determine the first interleaving table, where P1 is a positive integer greater than 1.

In one embodiment, the value in the first interleaving table is a maximum possible value of the number of bits in the first information block, and the number of bits in the first information block is used to perform an interleaving operation on the first information block and the first check bit block using the interleaving table.

In one embodiment, the value in the first interleaving table is the maximum possible value of the number of bits in the first information block, and the difference value between the maximum possible value of the number of bits in the first information block and the number of bits in the first information block is used to perform an interleaving operation on the first information block and the first check bit block using the first interleaving table.

In one embodiment, the first interleaving table includes an index column and a numerical column, the index column includes continuous index values that are in one-to-one correspondence with values in the numerical column, the index values are used to sequentially generate bits in the first bit block, the values in the first value set in the numerical column are in one-to-one association with bit positions in the third bit block, and the values in the numerical column are arranged in an ascending order of its corresponding index values.

In one embodiment, the number of index values included in the first interleaving table is equal to the number of bits in the third bit block, the first value is a value in the numerical column, the bit whose sequence number is equal to the first value in the third bit block is placed in the bit position whose sequence number is equal to the first index value in the first bit block, and the first index value corresponds to the first value in the first interleaving table.

In one embodiment, the number of index values included in the first interleaving table is greater than the number of bits in the third bit block, the first value is a value in the numerical column, the bit with the first sequence number in the third bit block is placed in the bit position corresponding to the second sequence number in the first bit block, the first sequence number is equal to the first value minus the first difference value, the first difference value is the difference value of the number of index values included in the first interleaving table minus the number of bits in the third bit block, the second sequence number corresponds to the first index value, the first index value corresponds to the first value in the first interleaving table, and the first value is not less than the first difference value.

In one embodiment, a value less than the first difference value in the numerical column is not used to interleave bits in the third bit block.

In one embodiment, there are at least two check bits in the first check bit block, and bits in the first information block exist in the middle of the position in the first bit block.

In one embodiment, the value of any one of the check bits in the first check bit block is unrelated to the bits whose position is subsequent to the check bit in the first bit block in the first information block.

In one embodiment, the value of any one of the check bits in the first check bit block can only be related to the bits whose position is prior to the check bit in the first bit block in the first information block, without being related to the bits whose position is subsequent to the check bit in the first bit block in the first information block.

In one embodiment, the value of any one of the check bits in the first check bit block is only related to the bits whose position is prior to the check bit in the first bit block in the first information block.

In one embodiment, the first check bit block is a CRC bit corresponding to the first information block.

In one embodiment, the CRC bit corresponding to the first information block is used to generate the first check bit block.

In one embodiment, the first check bit block is a convolutional code of the first information block.

In one embodiment, the convolutional code bits corresponding to the first information block are used to generate the first check bit block.

In one embodiment, the bits in the first check bit block are parity bits generated based on bits in the first information block.

In one embodiment, a first CRC polynomial is used to determine how to generate the first check bit block based on the first information block.

In one embodiment, the number of bits in the first check bit block is 24.

In one embodiment, the number of bits in the first check bit block is 16.

In one embodiment, the first check bit block is used to check, during the decoding process, whether the first information block is decoded correctly.

In one embodiment, the CRC bit corresponding to the first information block is scrambled to generate the first check bit block.

In one embodiment, the first CRC polynomial is used to generate a CRC bit corresponding to the first information block, and the CRC bit corresponding to the first information block generates the first check bit block after being subjected to a scrambling operation with a feature sequence.

In one embodiment, the scrambling operation is an exclusive OR operation.

In one embodiment, the feature sequence is specific to user equipment.

In one embodiment, the feature sequence is related to an identifier of user equipment.

In one embodiment, the feature sequence is an identifier of user equipment.

In one embodiment, the first channel coding further includes rate matching.

In one embodiment, the first channel coding includes the generation of the fourth bit block, the generation of the fifth bit block, the polar code and the rate matching.

In one embodiment, the first channel coding consists of the generation of the fourth bit block, the generation of the fifth bit block, the polar code and the rate matching.

In one embodiment, the first radio signal is an output after the first bit block is sequentially subjected to channel coding, scrambling, a modulation mapper, a layer mapper, precoding, a resource element mapper, and wideband symbol generation.

In one embodiment, the first radio signal is an output after the first bit block is sequentially subjected to channel coding, scrambling, a modulation mapper, a layer mapper, a transform precoder (which is configured to generate a complex value signal), precoding, a resource element mapper, and wideband symbol generation.

In one embodiment, the first radio signal is transmitted on a Physical Broadcast Channel (PBCH).

In one embodiment, the first radio signal is transmitted on a Physical Downlink Control Channel (PDCCH).

In one embodiment, the first radio signal is transmitted on an Enhanced Physical Downlink Control Channel (EPDCCH).

In one embodiment, the first radio signal is transmitted on a physical control channel.

In one embodiment, the value of the first sub-information block is related to the information format of the first information block, or the value of the first sub-information block is related to the Q.

In one embodiment, all the sub-information blocks other than the first sub-information block among the M sub-information blocks are unrelated to the value of the Q.

In one embodiment, the sub-information blocks other than the first sub-information block among the M sub-information blocks are not used to indicate the value of Q.

In one embodiment, the bits other than the P bits in the first information block are unrelated to the value of the Q.

In one embodiment, the bits other than the P bits in the first information block are not used to indicate the value of Q.

In one embodiment, the value of the first sub-information block indicates an information format of the first information block.

In one embodiment, the information format of the first information block is a candidate format of K1 candidate formats, and the value of the first sub-information block indicates the format of the first information block from the K1 candidate formats, where the K1 is a positive integer greater than one.

In one embodiment, the value of the first sub-information block is a index of an information format of the first information block in K1 candidate formats, where the K1 is a positive integer greater than one.

In one embodiment, the information format of the first information block is a candidate format of K1 candidate formats, and the value of the first sub-information block in a certain numerical range is in one-to-one correspondence with the K1 candidate formats, where the K1 is a positive integer greater than one.

In one embodiment, the value of the first sub-information block indicates the Q.

In one embodiment, the Q is a candidate value of K2 candidate values, and the value of the first sub-information block indicates the Q from the K2 candidate values, where the K2 is a positive integer greater than 1.

In one embodiment, the value of the first sub-information block is a number of the Q in K2 candidate values, where the K2 is a positive integer greater than one.

In one embodiment, the Q is a candidate value of K2 candidate values, and the value of the first sub-information block in a certain numerical range is in one-to-one correspondence with K2 candidate formats, where the K2 is a positive integer greater than one.

In one embodiment, the information format of the first information block is used to determine the value of Q.

In one embodiment, the first information block is Downlink Control Information (DCI), and the information format of the first information block is a DCI format of the first information block.

In one embodiment, the value of the first sub-information block is combined with the second information to determine the value of the Q.

In one embodiment, the second information refers to the number of subcarriers.

In one embodiment, the second information refers to a multi-antenna mode.

In one embodiment, the second information refers to a modulation coding format.

In one embodiment, the second information refers to a carrier frequency band.

In one embodiment, the base station equipment transmits a second radio signal, and the second radio signal indicates the second information.

In one embodiment, the value of the first sub-information block is used to determine the first format as the format of the first information block among the K1 candidate formats, and the second information is used to determine the value of the Q from among the K2 candidate values corresponding to the first format, where both the K1 and the K2 are positive integers greater than one.

In one embodiment, the third sub-information block is a sub-information block of the M sub-information blocks other than the first sub-information block, and the third sub-information block indicates a time-frequency resource used for subsequent transmission.

In one embodiment, the third sub-information block indicates a Resource Block (RB) used in downlink transmission.

In one embodiment, the third sub-information block indicates a Resource Block (RB) used in uplink transmission.

In one embodiment, the third sub-information block indicates an RB occupied by a physical downlink shared channel.

In one embodiment, the third sub-information block indicates an RB occupied by a physical uplink shared channel.

In one embodiment, the base station equipment assumes that the receiver of the first radio signal uses the Q padding bits as frozen bits in a channel decoding process.

In one embodiment, the base station equipment assumes that the receiver of the first radio signal uses the Q padding bits as known bits in a channel decoding process.

In one embodiment, the base station equipment assumes that the value of the first sub-information block is used by the receiver of the first radio signal to indicate the value of Q and the position of the Q padding bits in a decoding process.

In one embodiment, the base station equipment assumes that the value of the first sub-information block is used by the receiver of the first radio signal to decode the bits in the sub-information blocks other than the first sub-information block among the M sub-information blocks in a decoding process.

In one embodiment, the first sub-information block consists of P bits, where the P is a positive integer greater than one.

In one embodiment, both the first bit and the second bit belong to the first sub-information block, and there are Q3 padding bits locating between the positions of the first bit and the second bit in the first information block, where the Q3 is a positive integer.

In one embodiment, both the first bit and the second bit belong to the first sub-information block, there are Q4 padding bits locating between the positions of the first bit and the second bit in the first information block, and the Q4 bits are in the sub-information blocks other than the first sub-information block among the M sub-information blocks, where the Q4 is a positive integer.

In one embodiment, both the first bit and the second bit belong to the first sub-information block, there is at least one bit that does not belong to the first sub-information block locating between the positions of the first bit and the second bit in the first information block, the P bits are P bits continuous in position in the first bit block, and the positions of the P bits in the first information block are discontinuous.

In one embodiment, both the first bit and the second bit belong to the first sub-information block, there is at least one bit that does not belong to the first sub-information block locating between the positions of the first bit and the second bit in the first information block, the positions of the P bits in the first information block are discontinuous, and the P bits are P bits whose positions are front-most and continuous in the first bit block among the bits of the first information block.

In one embodiment, both the first bit and the second bit belong to the first sub-information block, there is at least one bit that does not belong to the first sub-information block locating between the positions of the first bit and the second bit in the first information block, the positions of the P bits in the first information block are discontinuous, the P bits are P bits which are the closest to the first check bit in the first bit block and are continuous in position prior to the first check bit, and the first check bit is a check bit whose position is front-most in the first bit block among the bits in the first check bit block.

In one embodiment, both the first bit and the second bit belong to the first sub-information block, there is at least one bit that does not belong to the first sub-information block locating between the positions of the first bit and the second bit in the first information block, the positions of the P bits in the first information block are discontinuous, the first sub-information block is a sub-information block with the highest reliability requirement for the sub-channels among the M sub-information blocks, the bits in the first bit block are arranged in an ascending order of the reliability coefficients corresponding to the sub-channels, and the P bits are P bits whose positions are ranked last and continuous in the first bit block among the bits of the first information block.

In one embodiment, both the first bit and the second bit belong to the first sub-information block, there is at least one bit that does not belong to the first sub-information block locating between the positions of the first bit and the second bit in the first information block, the P bits are P bits whose positions are discontinuous in the first bit block, and the positions of the P bits in the first information block are discontinuous.

In one embodiment, both the first bit and the second bit belong to the first sub-information block, there is at least one bit that does not belong to the first sub-information block locating between the positions of the first bit and the second bit in the first information block, the positions of the P bits in the first information block are discontinuous, the P bits are P bits whose positions are discontinuous in the first bit block, the P bits are P bits among P+P1 bits continuous in position in the first bit block, and the P+P1 bits include P1 bits in the first check bit block, where the P1 is a positive integer.

In one embodiment, both the first bit and the second bit belong to the first sub-information block, there is at least one bit that does not belong to the first sub-information block locating between the positions of the first bit and the second bit in the first information block, the positions of bits in the first sub-information block are discontinuous in the first information block, the second sub-information block is one of the M sub-information blocks, the positions where the bits in the first sub-information block are in the first information block are used to ensure that both the positions where bits in the second sub-information block are in the first bit block and the positions where bits in the second sub-information block are in the first information block are continuous.

In one embodiment, the value of the second sub-information block is related to the information format of the first information block, or the value of the second sub-information block is related to the Q.

In one embodiment, the second sub-information block is a sub-information block with the highest reliability requirement for the subchannels among the M sub-information blocks.

In one embodiment, the first bit and the second bit belong to the Q padding bits, and the first bit and the second bit have at least one belonging to a position of the first information block. The bits of the M sub-information blocks, the positions of the Q padding bits in the first information block are discontinuous, and the positions of the Q padding bits in the first bit block are continuous.

In one embodiment, the first bit and the second bit belong to the Q padding bits, there is at least one bit belonging to the M sub-information blocks locating between the positions of the first bit and the second bit in the first information block, the positions of the Q padding bits are discontinuous in the first information block, and the Q padding bits are the Q bits whose positions are front-most in the first bit block.

In one embodiment, the first bit and the second bit belong to the Q padding bits, there is at least one bit belonging to the M sub-information blocks locating between the positions of the first bit and the second bit in the first information block, the positions of the Q padding bits are discontinuous in the first information block, the first bit block includes a frozen bit block, and the Q padding bits are Q continuous bits that are closest to the frozen bit block in the first bit block.

In one embodiment, the first bit and the second bit belong to the Q padding bits, there is at least one bit belonging to the M sub-information blocks locating between the positions of the first bit and the second bit in the first information block, the positions of the Q padding bits are discontinuous in the first information block, the first bit block does not include a frozen bit block, the frozen bit block and the first bit block are cascaded to generate a fourth bit block, and the Q padding bits are Q continuous bits that are closest to the frozen bit block in the fourth bit block.

In one embodiment, the first bit and the second bit belong to the Q padding bits, there is at least one bit belonging to the M sub-information blocks locating between the positions of the first bit and the second bit in the first information block, the positions of the Q padding bits are discontinuous in the first information block, the second sub-information block is one of the M sub-information blocks, the positions of the Q padding bits in the first information block are used to ensure that both the positions where bits in the second sub-information block are in the first bit block and the positions where bits in the second sub-information block are in the first information block are continuous.

In one embodiment, the first sub-information block indicates Resource Assignment (RA).

In one embodiment, the first sub-information block indicates a Resource Block (RB).

In one embodiment, the first sub-information block is a Carrier Indicator Field (CIF), indicating a carrier.

In one embodiment, the first sub-information block indicates a Modulation Coding Scheme (MCS).

In one embodiment, the first sub-information block indicates a Redundancy Version (RV).

In one embodiment, the first sub-information block is a field in which a New Data Indicator (NDI) is located.

In one embodiment, the first sub-information block indicates multi-antenna-related configuration information.

In one embodiment, whether the positions where the bits in the first sub-information block are in the first information block are continuous is related to the number of bits in the first information block.

In one embodiment, if the number of bits in the first information block is Q1, the positions where the bits in the first sub-information block are in the first information block are continuous; if the number of bits in the first information block is Q2, the positions where the bits in the first sub-information block are in the first information block are discontinuous; and the Q1 and the Q2 are two different positive integers.

In one embodiment, whether the Q padding bits are continuous in the first information block is related to the number of bits in the first information block.

In one embodiment, if the number of bits in the first information block is Q1, the positions of the Q padding bits in the first information block are continuous; if the number of bits in the first information block is Q2, the positions of the Q padding bits in the first information block are discontinuous; and the Q1 and the Q2 are two different positive integers.

In one embodiment, the number of bits in the first information block is a payload size of a DCI format.

In one embodiment, the positions where the bits in the first sub-information block are in the first information block are discontinuous, and the positions of the Q padding bits in the first information block are also discontinuous.

According to an aspect of the present disclosure, the M sub-information blocks are sequentially cascaded with the Q padding bits to generate a second information block, and the second information block is interleaved to generate the first information block.

In one embodiment, the above method has the advantage that the bits in the DCI are interleaved according to the DCI format and the performance optimization requirement before cascading and interleaving the bits in the DCI and the check bit corresponding to the DCI, so as to form the bit distribution beneficial to improving the decoding performance.

In one embodiment, the M sub-information blocks are sequentially cascaded with the Q padding bits to generate a second information block, and the second information block is interleaved to generate the first information block; both the first bit and the second bit belong to the first sub-information block, and there is at least one bit that does not belong to the first sub-information block locating between the positions of the first bit and the second bit in the first information block.

In one embodiment, the first bit and the second bit belong to the Q padding bits, and there is at least one bit belonging to the M sub-information blocks locating between the positions of the first bit and the second bit in the first information block.

In one embodiment, the second information block is a DCI.

In one embodiment, the second interleaving table is used to interleave the second information block to generate the first information block.

In one embodiment, the length of the second interleaving table is related to the number of bits in the first information block.

In one embodiment, if the number of bits in the first information block is Q1, the second interleaving table is used to interleave the second information block to generate the first information block; if the number of bits in the first information block is Q2, the third interleaving table is used to interleave the second information block to generate the first information block; where the Q1 and the Q2 are two different positive integers, and the second interleaving table and the third interleaving table are two different interleaving tables.

According to an aspect of the present disclosure, the positions of the bits in the first sub-information block are continuous in the first bit block.

In one embodiment, the above method has the advantage of optimizing the decoding performance using the properties of a plurality of continuous subchannels corresponding to the bits in the first bit block.

In one embodiment, the positions of the bits in the first sub-information block are continuous in the first bit block, the first sub-information block is one of the M sub-information blocks; both the first bit and the second bit belong to the first sub-information block, and there is at least one bit that does not belong to the first sub-information block locating between the positions of the first bit and the second bit in the first information block, In one embodiment, the positions of the bits in the first sub-information block are continuous in the first bit block, the first bit and the second bit belong to the Q padding bits, and there is at least one bit belonging to the M sub-information blocks locating between the positions of the first bit and the second bit in the first information block.

In one embodiment, the P bits are the P bits whose positions are front-most in the first bit block among the bits of the first information block.

In one embodiment, the P bits are the P bits that are ranked last in the first bit block among the bits of the first information block.

In one embodiment, the P bits are the P bits whose positions are closest to the first check bit and prior to the first check bit in the first bit block among the bits of the first information block.

According to an aspect of the present disclosure, the positions of the Q padding bits are continuous in the first bit block.

In one embodiment, the above method has the advantage of optimizing the decoding performance using the properties of a plurality of continuous subchannels corresponding to the bits in the first bit block.

In one embodiment, the positions of the Q padding bits are continuous in the first bit block, both the first bit and the second bit belong to the first sub-information block, and there is at least one bit that does not belong to the first sub-information block locating between the positions of the first bit and the second bit in the first information block, In one embodiment, the positions of the Q padding bits are continuous in the first bit block, the first bit and the second bit belong to the Q padding bits, and there is at least one bit belonging to the M sub-information blocks locating between the positions of the first bit and the second bit in the first information block.

In one embodiment, the Q bits are the Q bits whose positions are front-most in the first bit block among the bits of the first information block.

In one embodiment, the bits in the first bit block are sequentially arranged in an ascending order of the reliability of the corresponding subchannels, and the Q bits are the Q bits whose positions are front-most in the first bit block.

In one embodiment, the bits in the first bit block are sequentially arranged in a descending order of the reliability of the corresponding subchannels, and the Q bits are the Q bits that are ranked last in the first bit block.

In one embodiment, the first bit block is cascaded with a frozen bit block to generate a third bit block, and the Q bits are the Q bits that are closest to the frozen bit block in the first bit block.

According to an aspect of the present disclosure, the Q padding bits are Q bits whose positions are front-most in the first bit block.

In one embodiment, the Q padding bits are Q bits whose positions are front-most in the first bit block; the first bit and the second bit belong to the Q padding bits, and there is at least one bit belonging to the M sub-information blocks locating between the positions of the first bit and the second bit in the first information block.

In one embodiment, the Q padding bits are Q bits whose positions are front-most in the first bit block; both the first bit and the second bit belong to the first sub-information block, and there is at least one bit that does not belong to the first sub-information block locating between the positions of the first bit and the second bit in the first information block.

In one embodiment, the frozen bit block and the first bit block are sequentially cascaded to generate a third bit block. The Q padding bits are Q bits whose positions are front-most in the first bit block and are also Q bits closest to the frozen bit block.

In one embodiment, the bits in the first bit block are sequentially arranged in an ascending order of the reliability of the corresponding subchannels. The Q padding bits are Q bits whose positions are front-most in the first bit block and are also Q bits with the lowest reliability of the corresponding subchannels.

According to an aspect of the present disclosure, the bits in the first sub-information block are Q bits whose positions are front-most in the first bit block.

In one embodiment, the bits in the first sub-information block are Q bits whose positions are front-most in the first bit block; both the first bit and the second bit belong to the first sub-information block, and there is at least one bit that does not belong to the first sub-information block locating between the positions of the first bit and the second bit in the first information block.

In one embodiment, the bits in the first sub-information block are Q bits whose positions are front-most in the first bit block; the first bit and the second bit belong to the Q padding bits, and there is at least one bit belonging to the M sub-information blocks locating between the positions of the first bit and the second bit in the first information block.

In one embodiment, the bits in the first bit block are arranged chronologically in a coding order assumed by the base station equipment, and the base station equipment assumes that the bits in the first sub-information block are the bits obtained by being decoded earliest in the first bit block.

In one embodiment, the bits in the first bit block are arranged in an ascending order of the reliability of the corresponding sub-channels, and the reliability of the sub-channels corresponding to the first sub-information block is lowest in the M sub-information blocks.

In one embodiment, the bits in the first bit block are arranged in an ascending order of the reliability of the corresponding sub-channels, and the first sub-information block is the sub-information block with the lowest reliability requirement among the M sub-information blocks.

According to an aspect of the present disclosure, the value of the first sub-information block is related to the information format of the first information block, or the value of the first sub-information block is related to the Q.

In one embodiment, the value of the first sub-information block is related to the information format of the first information block, or the value of the first sub-information block is related to the Q; both the first bit and the second bit belong to the first sub-information block, and there is at least one bit that does not belong to the first sub-information block locating between the positions of the first bit and the second bit in the first information block.

In one embodiment, the value of the first sub-information block is related to the information format of the first information block, or the value of the first sub-information block is related to the Q; the first bit and the second bit belong to the Q padding bits, and there is at least one bit belonging to the M sub-information blocks locating between the positions of the first bit and the second bit in the first information block.

According to an aspect of the present disclosure, the bits in the first bit block are sequentially arranged in an ascending order of reliability coefficients corresponding to the subchannels of the polar code.

In one embodiment, the bits in the first bit block are sequentially arranged in an ascending order of reliability coefficients corresponding to the subchannels of the polar code, both the first bit and the second bit belong to the first sub-information block, and there is at least one bit that does not belong to the first sub-information block locating between the positions of the first bit and the second bit in the first information block.

In one embodiment, the bits in the first bit block are sequentially arranged in an ascending order of reliability coefficients corresponding to the subchannels of the polar code, the first bit and the second bit belong to the Q padding bits, and there is at least one bit belonging to the M sub-information blocks locating between the positions of the first bit and the second bit in the first information block.

The present disclosure discloses a method in user equipment for wireless communication, including:

receiving a first radio signal;

performing first channel decoding, wherein the first radio signal is used for an input of the first channel decoding, the first channel decoding corresponds to the first channel coding, the first channel coding is based on a polar code, and a first bit block is used for an input of the first channel coding; and recovering a first information block, wherein the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer;

wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the M sub-information blocks correspond to M fields in one DCI, respectively. The M sub-information blocks are directed to M control objects, respectively. The values of the M sub-information blocks indicate the status of the M control objects, respectively. The user equipment adjusts the M control objects to the status indicated by the values of the M sub-information blocks in the time domain resource for the DCI according to the values of the M sub-information blocks.

In one embodiment, the M sub-information blocks correspond to M fields in one piece of broadcast information, respectively. The M sub-information blocks are directed to M control objects, respectively. The values of the M sub-information blocks indicate the status of the M control objects, respectively. The user equipment adjusts the M control objects to the status indicated by the values of the M sub-information blocks in the time domain resource for the DCI according to the values of the M sub-information blocks.

In one embodiment, the first information block is transmitted for a Physical Downlink Shared Channel (PDSCH) in a first time domain resource. The fourth sub-information block and the fifth sub-information block are two sub-information blocks in the M sub-information blocks. The value of the fourth sub-information block indicates a first modulation coding scheme, the value of the fifth sub-information block indicates a first time-frequency resource pool occupied for transmission; the user equipment receives a data signal using the first modulation coding scheme on the first time-frequency resource pool in the first time domain resource.

In one embodiment, the first information block is transmitted for a Physical Uplink Shared Channel (PUSCH) in a first time domain resource. The fourth sub-information block and the fifth sub-information block are two sub-information blocks in the M sub-information blocks. The value of the fourth sub-information block indicates a first modulation coding scheme, the value of the fifth sub-information block indicates a first multi-antenna technical scheme; the user equipment transmits a data signal using the first modulation coding scheme and the first multi-antenna technical scheme on the PUSCH channel in the first time domain resource.

In one embodiment, the first channel decoding is serial channel decoding.

In one embodiment, a Successive Cancellation List (SCL) is used in the first channel decoding to decode the polar code.

In one embodiment, a Successive Cancellation Stack (SCS) is used in the first channel decoding to decode the polar code.

In one embodiment, the first channel decoding is used to recover the first bit block.

In one embodiment, the first channel decoding is used to recover soft bits corresponding to the first bit block.

In one embodiment, bits are extracted from the first bit block for reordering to recover the first information block.

In one embodiment, the first bit block is deinterleaved to recover the first information block.

In one embodiment, the value of the first sub-information block is related to the information format of the first information block, or the value of the first sub-information block is related to the Q; both the first bit and the second bit belong to the first sub-information block, and there is at least one bit that does not belong to the first sub-information block locating between the positions of the first bit and the second bit in the first information block In one embodiment, the first channel decoding recovers the first sub-information block prior to recovering all bits in the first information block.

In one embodiment, the first sub-information block is used by the first channel decoding to recover bits in the first information block.

In one embodiment, after the first channel decoding is used to recover the first sub-information block, the user equipment continues to use the first channel decoding for decoding with the Q padding bits indicated by the first sub-information block as frozen bits, thereby recovering the bits in the first information block.

In one embodiment, after the first channel decoding is used to recover the first sub-information block, the user equipment continues to use the first channel decoding for decoding with its corresponding Q padding bits as frozen bits according to the information format of the first information block indicated by the first sub-information block, thereby recovering the bits in the first information block.

In one embodiment, the first check bit block is used to check whether the first sub-information block is decoded correctly.

In one embodiment, the first channel decoding first recovers the first check bit and the first bit set prior to the first check bit in the first bit block, the bits in the first sub-information block are the bits in the first bit set, and the user equipment assumes that the first bit set is used to generate the first check bit and the bits other than the first bit set are not used to generate the first check bit. The first channel decoding uses the first check bit to determine whether the decoding of the first bit set is correct. If the first bit set passes the check of the first check bit, the first sub-information block is used to determine the value of the Q and the position of the Q padding bits in the first information block, and the first channel decoding uses the Q padding bits as Q frozen bits to decode non-padding bits and the L check bits in the first information block.

In one embodiment, if the first bit set does not pass the check of the first check bit, the user equipment stops the decoding operation of the first information block.

In one embodiment, the user equipment assumes that the first check bit is an exclusive OR result of bits of the first bit set.

In one embodiment, the user equipment assumes that a CRC polynomial is used to generate a first check bit block for the first information block.

In one embodiment, the second sub-information block is another sub-information block among the M sub-information blocks except the first sub-information block; the value of the second sub-information block is related to the information format of the first information block, or the value of the second sub-information block is related to the Q; both the first bit and the second bit belong to the first sub-information block, there is at least one bit that does not belong to the first sub-information block locating between the positions of the first bit and the second bit in the first information block; the positions where the bits in the first sub-information block are in the first information block are used to ensure that both the positions where bits in the second sub-information block are in the first bit block and the positions where bits in the second sub-information block are in the first information block are continuous.

In one embodiment, after the first channel decoding is used to recover the first sub-information block, the user equipment continues to use the first channel decoding for decoding with the Q padding bits indicated by the second sub-information block as frozen bits, thereby recovering the bits in the first information block.

In one embodiment, the first bit and the second bit belong to the Q padding bits, and there is at least one bit belonging to the M sub-information blocks locating between the positions of the first bit and the second bit in the first information block; the Q padding bits are the Q bits with the lowest reliability of the sub-channels in the first bit block.

In one embodiment, the first channel coding does not use the Q padding bits as frozen bits.

According to an aspect of the present disclosure, the M sub-information blocks are sequentially cascaded with the Q padding bits to generate a second information block, and the second information block is interleaved to generate the first information block.

According to an aspect of the present disclosure, the positions of the bits in the first sub-information block are continuous in the first bit block.

According to an aspect of the present disclosure, the positions of the Q padding bits are continuous in the first bit block.

According to an aspect of the present disclosure, the Q padding bits are Q bits whose positions are front-most in the first bit block.

According to an aspect of the present disclosure, the bits in the first sub-information block are Q bits whose positions are front-most in the first bit block.

According to an aspect of the present disclosure, the value of the first sub-information block is related to the information format of the first information block, or the value of the first sub-information block is related to the Q.

According to an aspect of the present disclosure, the bits in the first bit block are sequentially arranged in an ascending order of reliability coefficients corresponding to the subchannels of the polar code.

The present disclosure discloses base station equipment for wireless communication, including:

a first processor module configured to generate a first information block, wherein the first information block consists of bits in M sub-information blocks and Q padding bits, where the M is a positive integer greater than one, and the Q is a non-negative positive integer;

a first channel encoder configured to perform first channel coding, wherein the first channel coding is based on a polar code, a first bit block is used for an input of the first channel coding, the first information block and the first check bit block are interleaved to generate the first bit block, and the first information block is used to generate the first check bit block; and a first transmitter module configured to transmit a first radio signal, wherein the output of the first channel coding is used to generate the first radio signal;

wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the above base station equipment is characterized in that the M sub-information blocks are sequentially cascaded with the Q padding bits to generate a second information block, and the second information block is interleaved to generate the first information block.

In one embodiment, the above base station equipment is characterized in that the positions of the bits in the first sub-information block are continuous in the first bit block.

In one embodiment, the above base station equipment is characterized in that the positions of the Q padding bits are continuous in the first bit block.

In one embodiment, the above base station equipment is characterized in that the Q padding bits are Q bits whose positions are front-most in the first bit block.

In one embodiment, the above base station equipment is characterized in that the bits in the first sub-information block are Q bits whose positions are front-most in the first bit block.

In one embodiment, the above base station equipment is characterized in that the value of the first sub-information block is related to the information format of the first information block, or the value of the first sub-information block is related to the Q.

In one embodiment, the above base station equipment is characterized in that the bits in the first bit block are sequentially arranged in an ascending order of reliability coefficients corresponding to the subchannels of the polar code.

The present disclosure discloses user equipment for wireless communication, including:

a first receiver module configured to receive a first radio signal;

a first channel decoder configured to perform first channel decoding, wherein the first radio signal is used for an input of the first channel decoding, the first channel decoding corresponds to the first channel coding, the first channel coding is based on a polar code, and a first bit block is used for an input of the first channel coding; and a second processor module configured to recover a first information block, wherein the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer;

wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the above user equipment is characterized in that the M sub-information blocks are sequentially cascaded with the Q padding bits to generate a second information block, and the second information block is interleaved to generate the first information block.

In one embodiment, the above user equipment is characterized in that the positions of the bits in the first sub-information block are continuous in the first bit block.

In one embodiment, the above user equipment is characterized in that the positions of the Q padding bits are continuous in the first bit block.

In one embodiment, the above user equipment is characterized in that the Q padding bits are Q bits whose positions are front-most in the first bit block.

In one embodiment, the above user equipment is characterized in that the bits in the first sub-information block are Q bits whose positions are front-most in the first bit block.

In one embodiment, the above base station equipment is characterized in that the value of the first sub-information block is related to the information format of the first information block, or the value of the first sub-information block is related to the Q.

In one embodiment, the above user equipment is characterized in that the bits in the first bit block are sequentially arranged in an ascending order of reliability coefficients corresponding to the subchannels of the polar code.

In one embodiment, the present disclosure has the following advantages over the conventional scheme:

improving decoding performance by optimizing the distribution of DCI format indicator bits or padding bits.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical schemes of the present disclosure will be further described in detail below with reference to the accompanying drawings. It should be noted that the embodiments of the present disclosure and the features in the embodiments may be combined with each other without conflict.

Embodiment 1

Figure 1:
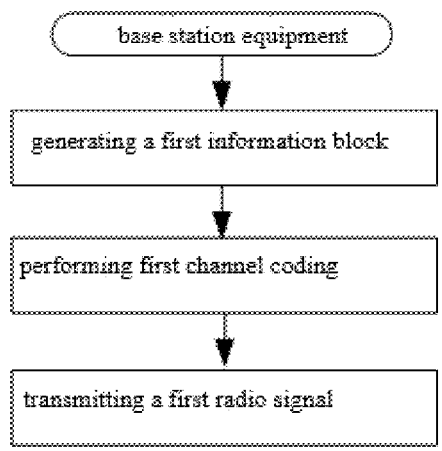
FIG. 1 is a flow chart illustrating a first information block, first channel coding and a first radio signal according to one embodiment of the present disclosure.

Embodiment 1 illustrates a first information block, first channel coding and a first radio signal according to the present disclosure, as shown in FIG. 1. In FIG. 1, each block represents a step. In Embodiment 1, the base station equipment in the present disclosure sequentially generates a first information block, performs first channel coding, and transmits a first radio signal; wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the polar code refers to using the result of multiplying an input bit block of length N by a Kronecker matrix having N rows and N columns as an output of a polar code, the input bit block includes the bits in the first information block, and the bits in the first check bit block and frozen bits.

In one embodiment, the first bit block does not include frozen bits, and one frozen bit block and the first bit block are sequentially cascaded to generate a fourth bit block.

In one embodiment, the bits in the fourth bit block are arranged in an ascending order of reliability coefficients corresponding to the subchannels.

The positions of the bits in the fourth bit block are in one-to-one correspondence with N reliability coefficients, respectively, the N reliability coefficients are in one-to-one correspondence with the sequence numbers of the N subchannels, respectively, the bits in the fourth bit block are placed on the subchannel corresponding to their position, and the bits on the N subchannels are arranged in an ascending order of the sequence numbers of the N subchannels to form the fifth bit block.

In one embodiment, the fifth bit block is used as an input of the polar code.

In one embodiment, the first information block is a DCI block.

In one embodiment, a PDCCH is used to transmit the first information block.

In one embodiment, the first sub-information block indicates an information format of the first information block, and the information format of the first information block is used to determine the value of Q.

In one embodiment, the sequential order in which the bits in the first information block are in the first information block is different from the sequential order in which the bits in the first information block are in the first bit block.

In one embodiment, the first information block and the first check bit block are sequentially cascaded to generate a third bit block, and the first interleaving table is used to interleave the third bit block to generate the first bit block.

In one embodiment, the first interleaving table includes an index column and a numerical column, the index column includes continuous index values that are in one-to-one correspondence with values in the numerical column, the index values are used to sequentially generate bits in the first bit block, the values in the first value set in the numerical column are in one-to-one association with bit positions in the third bit block, and the values in the numerical column are arranged in an ascending order of its corresponding index values.

In one embodiment, the first sub-information block consists of 2 bits.

In one embodiment, the first sub-information block consists of 3 bits.

In one embodiment, the first sub-information block consists of 4 bits.

In one embodiment, the first channel coding includes rate matching.

In one embodiment, the output of the polar code is used as an input of rate matching.

In one embodiment, the output of the first channel coding is an output after rate matching.

Embodiment 2

Figure 2:
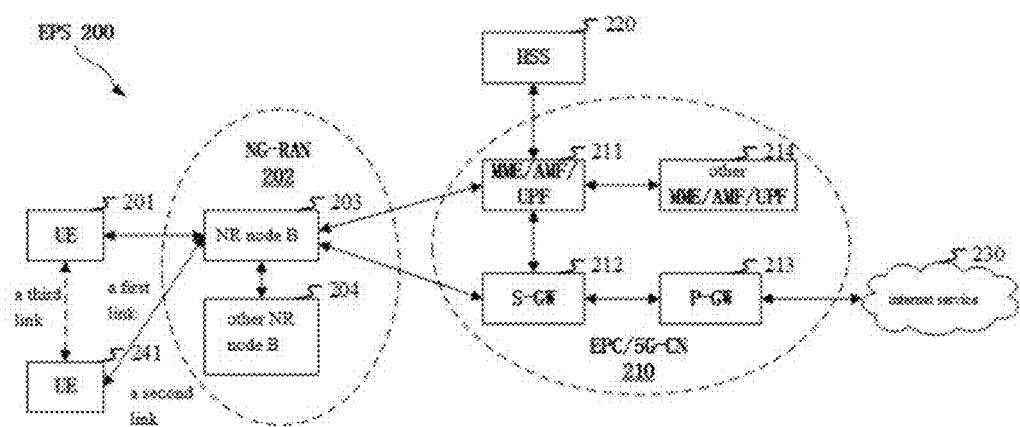
FIG. 2 is a schematic diagram illustrating a network architecture according to one embodiment of the present disclosure.

Embodiment 2 illustrates a schematic diagram of a network architecture according to the present disclosure, as shown in FIG. 2. FIG. 2 illustrates a diagram of a system network architecture 200 of NR 5G, Long-Term Evolution (LTE), and Long-Term Evolution Advanced (LTE-A). The NR 5G or LTE network architecture 200 may be referred to as an Evolved Packet System (EPS) 200 or other appropriate terms. The EPS 200 may include one or more of User Equipment (UE) 201, a Next Generation Radio Access Network (NG-RAN) 202, an Evolved Packet Core (EPC)/5G-Core Network (5G-CN) 210, a Home Subscriber Server (HSS) 220 and an Internet Service 230. The EPS may be interconnected with other access networks. For simple description, the entities/interfaces are not shown. As shown in the figure, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other MME/AMF/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212.

The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the UE in the present disclosure.

In one embodiment, the gNB 203 corresponds to the base station in the present disclosure.

In one embodiment, the UE 201 supports polar code decoding.

In one embodiment, the gNB 203 supports polar code coding.

Embodiment 3

Figure 3:
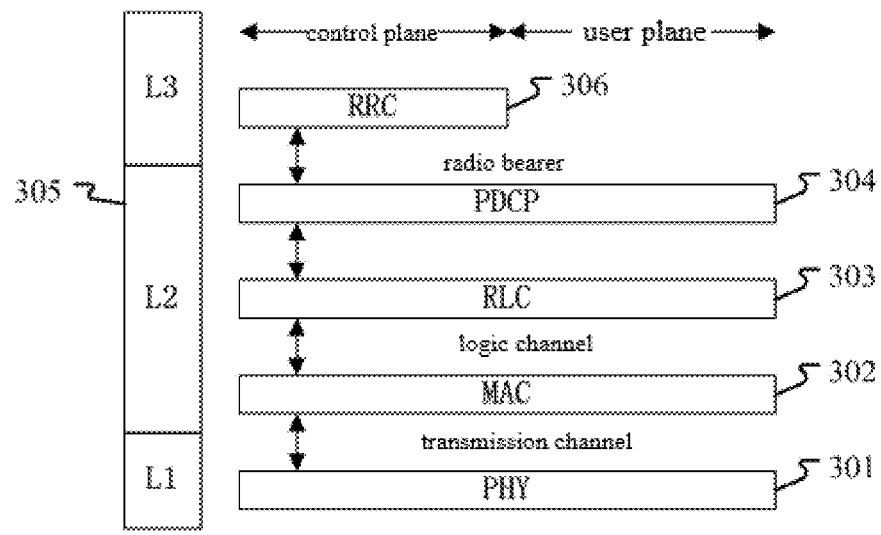
FIG. 3 is a schematic diagram illustrating a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 illustrates a schematic diagram of a radio protocol architecture of a user plane and a control plane. In FIG. 3, the radio protocol architecture of user equipment (UE) and Base Station Equipment (gNB or eNB) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station equipment in the present disclosure.

In one embodiment, the first radio signal in the present disclosure is generated by the PHY 301.

In one embodiment, the first information in the present disclosure is generated by the PHY 301.

Embodiment 4

Figure 4:
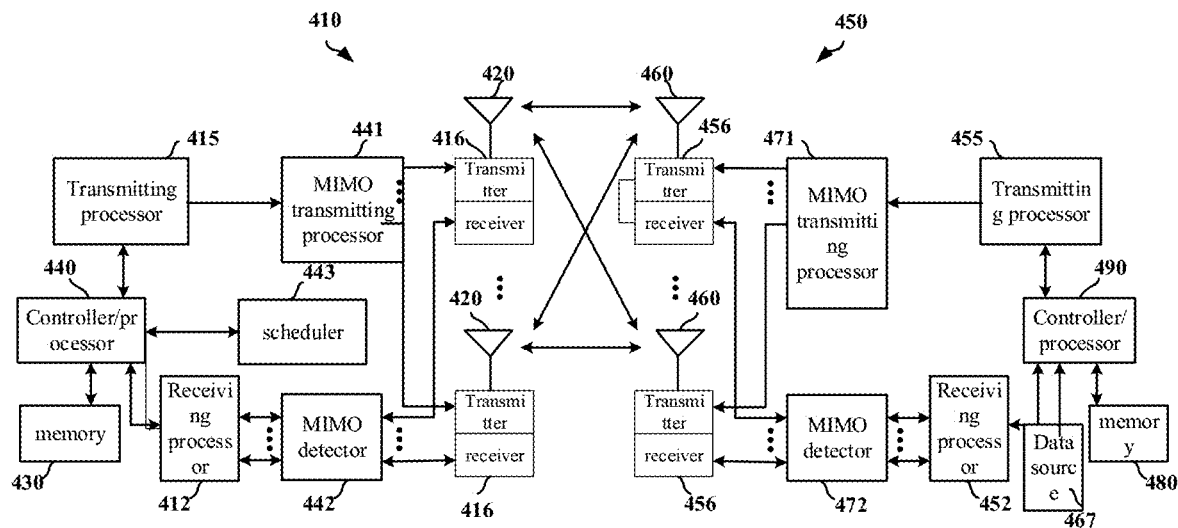
FIG. 4 is a schematic diagram illustrating an evolved node and a given user equipment according to one embodiment of the present disclosure.

Embodiment 4 shows a schematic diagram of base station equipment and given user equipment according to the present disclosure, as shown in FIG. 4. FIG. 4 is a block diagram of a gNB 410 in communication with UE 450 in an access network.

The base station equipment (410) may include a controller/processor 440, a scheduler 443, a memory 430, a receiving processor 412, a transmitting processor 415, a MIMO transmitting processor 441, a MIMO detector 442, a transmitter/receiver 416 and an antenna 420.

The user equipment (UE 450) may include a controller/processor 490, a memory 480, a data source 467, a transmitting processor 455, a receiving processor 452, a MIMO transmitting processor 471, a MIMO detector 472, a transmitter/receiver 456, and an antenna 460.

In the downlink transmission, the processing related to the base station equipment (410) may include the following steps:

the upper-layer packet arrives at the controller/processor 440, which provides packet header compression, encryption, packet segmentation and reordering, and multiplexing and demultiplexing between the logical and transport channels for implementing the L2 layer protocol for the user plane and the control plane; the upper-layer packet may include data or control information, such as a Downlink Shared Channel (DL-SCH);

the controller/processor 440 may be associated with a memory 430 that stores program codes and data, the memory 430 may be a computer-readable medium;

the controller/processor 440 notifies the scheduler 443 of the transmission request, and the scheduler 443 is configured to schedule the air interface resource corresponding to the transmission requirement and notify the controller/processor 440 of the scheduling result;

the controller/processor 440 transmits the control information for the downlink transmission obtained in such a way that the receiving processor 412 processes the uplink receiving to the transmitting processor 415;

the transmitting processor 415 receives the output bit stream of controller/processor 440, and implements various signal transmission processing functions for the L1 layer (i.e., the physical layer) including coding, interleaving, scrambling, modulating, power control/allocation, and generates physics layer control signaling (including a PBCH, a PDCCH, a PHICH, a PCFICH, a reference signal), etc.;

the MIMO transmitting processor 441 performs spatial processing of data symbols, control symbols or reference signal symbols (such as multi-antenna precoding, digital beamforming), and outputs baseband signals to the transmitter 416;

the MIMO transmitting processor 441 outputs an analog transmitting beamforming vector to the transmitter 416;

the transmitter 416 is configured to convert the baseband signals provided by the MIMO transmitting processor 441 into radio frequency signals and transmit the signals via the antenna 420; each transmitter 416 samples the respective input symbol streams to obtain respective sampled signal streams; each transmitter 416 performs further processing (such as digital to analog conversion, amplification, filtering, upconversion, etc.) on the respective sampling streams to obtain downlink signals; the analog transmitting beamforming is processed in the transmitter 416.

In the downlink transmission, the processing related to the user equipment (UE 450) may include the following steps:

the receiver 456 is configured to convert radio frequency signals received through the antenna 460 into baseband signals and provide the signals to the MIMO detector 472; the analog receiving beamforming is processed in the receiver 456;

the MIMO detector 472 is configured to perform MIMO detection on the signal received from the receiver 456 and provide baseband signals that have been subjected to MIMO detection to the receiving processor 452;

the receiving processor 452 is configured to extract parameters related to the analog receiving beamforming and output the parameters to the MIMO detector 472, and the MIMO detector 472 outputs the analog receiving beamforming vector to the receiver 456;

the receiving processor 452 implements various signal transmission processing functions for the L1 layer (i.e., the physical layer) including decoding, deinterleaving, descrambling, demodulating, and physical layer control signaling extraction, etc.

the controller/processor 490 receives the bit stream output by the receiving processor 452, and provides packet header decompression, decryption, packet segmentation and reordering, and multiplexing and demultiplexing between the logical and transport channels for implementation the L2 layer protocol for the user plane and the control plane;

the controller/processor 490 may be associated with a memory 480 that stores program codes and data, the memory 480 may be a computer-readable medium;

the controller/processor 490 transmits the control information for the downlink receiving obtained in such a way that the transmitting processor 455 processes the uplink transmission to the receiving processor 452.

The first sub-information block, the first information block, the first bit block and the first radio signal in the present disclosure are sequentially generated by the transmitting processor 415. The MIMO transmitting processor 441 performs multi-antenna precoding on the baseband signal related to the first radio signal output by the transmitting processor 415. The transmitter 416 converts the baseband signal provided by the MIMO transmitting processor 441 into a radio frequency signal, performs analog transmitting beamforming, and transmits the signal via the antenna 420. The receiver 456 will receive the signal through the antenna 460, perform analog receiving beamforming, obtain a radio frequency signal related to the first radio signal, convert the signal into a baseband signal and provide the baseband signal to the MIMO detector 472. The MIMO detector 472 performs MIMO detection on the signal received from the receiver 456. The receiving processor 452 processes the baseband signal output by the MIMO detector 472 to sequentially obtain the first radio signal, the first sub-information block, the first bit block and the first information block.

In the uplink transmission, the processing related to the user equipment (UE 450) may include the following steps:

The data source 467 provides an upper-layer packet to controller/processor 490, which provides packet header compression, encryption, packet segmentation and reordering, and multiplexing and demultiplexing between the logical and transport channels for implementing the L2 layer protocol for the user plane and the control plane; the upper-layer packet may include data or control information, such as a Uplink Shared Channel (UL-SCH);

the controller/processor 490 may be associated with a memory 480 that stores program codes and data, the memory 480 may be a computer-readable medium;

the controller/processor 490 transmits the control information for the uplink transmission obtained in such a way that the receiving processor 452 processes the downlink receiving to the transmitting processor 455;

the transmitting processor 455 receives the output bit stream of controller/processor 490, and implements various signal transmission processing functions for the L1 layer (i.e., the physical layer) including coding, interleaving, scrambling, modulating, power control/allocation, and generates physics layer control signaling (including a PBCH, a PDCCH, a PHICH, a PCFICH, a reference signal), etc., the MIMO transmitting processor 471 performs spatial processing of data symbols, control symbols or reference signal symbols (such as multi-antenna precoding, digital beamforming), and outputs baseband signals to the transmitter 456;

the MIMO transmitting processor 471 outputs an analog transmitting beamforming vector to the transmitter 456;

the transmitter 456 is configured to convert the baseband signals provided by the MIMO transmitting processor 471 into radio frequency signals and transmit the signals via the antenna 460; each transmitter 456 samples the respective input symbol streams to obtain respective sampled signal streams; each transmitter 456 performs further processing (such as digital to analog conversion, amplification, filtering, upconversion, etc.) on the respective sampling streams to obtain uplink signals; the analog transmitting beamforming is processed in the transmitter 456.

In the uplink transmission, the processing related to the base station equipment (410) may include the following steps:

the receiver 456 is configured to convert radio frequency signals received through the antenna 420 into baseband signals and provide the signals to the MIMO detector 442; the analog receiving beamforming is processed in the receiver 416;

the MIMO detector 442 is configured to perform MIMO detection on the signal received from the receiver 416 and provide baseband signals that have been subjected to MIMO detection to the receiving processor 442;

the MIMO detector 442 outputs an analog receiving beamforming vector to the receiver 416;

the receiving processor 412 implements various signal transmission processing functions for the L1 layer (i.e., the physical layer) including decoding, deinterleaving, descrambling, demodulating, and physical layer control signaling extraction, etc.

the controller/processor 440 receives the bit stream output by the receiving processor 412, provides packet header decompression, decryption, packet segmentation and reordering, and multiplexing and demultiplexing between the logical and transport channels for implementation the L2 layer protocol for the user plane and the control plane;

the controller/processor 440 may be associated with a memory 430 that stores program codes and data, the memory 430 may be a computer-readable medium;

the controller/processor 440 transmits the control information for the uplink transmission obtained in such a way that the transmitting processor 415 processes the downlink receiving to the receiving processor 412.

In one embodiment, the gNB 410 device includes: at least one processor and at least one memory, wherein the at least one memory includes a computer program code; the at least one memory and the computer program code are configured to be used together with the at least one processor. The gNB 410 device at least: generates a first information block, wherein the first information block consists of bits in M sub-information blocks and Q padding bits, where the M is a positive integer greater than one, and the Q is a non-negative positive integer; performs first channel coding, wherein the first channel coding is based on a polar code, a first bit block is used for an input of the first channel coding, the first information block and the first check bit block are interleaved to generate the first bit block, and the first information block is used to generate the first check bit block; and transmits a first radio signal, wherein the output of the first channel coding is used to generate the first radio signal; wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the gNB 410 includes: a memory in which a computer-readable instruction program is stored, wherein the computer-readable instruction program generates an action when executed by at least one processor, the action includes: generating a first information block, wherein the first information block consists of bits in M sub-information blocks and Q padding bits, where the M is a positive integer greater than one, and the Q is a non-negative positive integer; performing first channel coding, wherein the first channel coding is based on a polar code, a first bit block is used for an input of the first channel coding, the first information block and the first check bit block are interleaved to generate the first bit block, and the first information block is used to generate the first check bit block; and transmitting a first radio signal, wherein the output of the first channel coding is used to generate the first radio signal; wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the UE 450 device includes: at least one processor and at least one memory, wherein the at least one memory includes a computer program code; the at least one memory and the computer program code are configured to be used together with the at least one processor. The UE 450 device at least: receives a first radio signal; performs first channel decoding, wherein the first radio signal is used for an input of the first channel decoding, the first channel decoding corresponds to the first channel coding, the first channel coding is based on a polar code, and a first bit block is used for an input of the first channel coding; and recovers a first information block, wherein the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer; wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the UE 450 includes: a memory in which a computer-readable instruction program is stored, wherein the computer-readable instruction program generates an action when executed by at least one processor, the action includes: receiving a first radio signal; performing first channel decoding, wherein the first radio signal is used for an input of the first channel decoding, the first channel decoding corresponds to the first channel coding, the first channel coding is based on a polar code, and a first bit block is used for an input of the first channel coding; and recovering a first information block, wherein the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer; wherein the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the gNB 410 corresponds to the base station in the present disclosure.

In one embodiment, the UE 450 corresponds to the user equipment in the present disclosure.

In one embodiment, the gNB 410 corresponds to the base station in the present disclosure.

In one embodiment, the UE 450 corresponds to the user equipment in the present disclosure.

In one embodiment, a transmitting processor 415, a MIMO transmitter 441, and a transmitter 416 are used to transmit the first radio signal in the present disclosure.

In one embodiment, a receiver 456, a MIMO detector 472, and a receiving processor 452 are used to receive the first radio signal in the present disclosure.

In one embodiment, the transmitting processor 415 is used to generate a first information block.

In one embodiment, the receiving processor 452 is used to recover the first information block.

In one embodiment, the transmitting processor 415 is used to perform the first channel coding.

In one embodiment, the receiving processor 452 is configured to perform first channel decoding.

Embodiment 5

Figure 5:
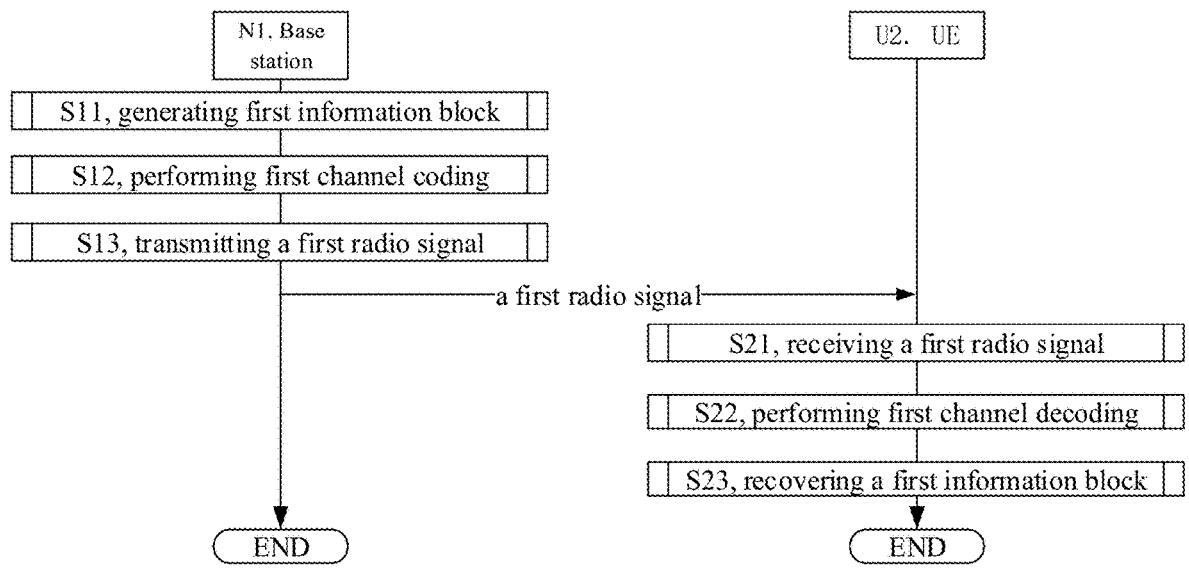
FIG. 5 is a flow chart illustrating transmission of a radio signal according to one embodiment of the present disclosure.

Embodiment 5 is a flow chart illustrating a radio signal transmission according to the present disclosure, as shown in FIG. 5. In FIG. 5, the base station N1 is a maintenance base station of the serving cell of the UE U2.

The base station N1 generates a first information block in step S11, performs first channel coding in step S12, and transmits a first radio signal in step S13.

The UE U2 receives the first radio signal in step S21, performs first channel decoding in step S22, and recovers the first information block in step S23.

In Embodiment 5, the first information block consists of bits in M sub-information blocks and Q padding bits, where the M is a positive integer greater than one, and the Q is a non-negative positive integer; the first channel coding is based on a polar code, a first bit block is used by N1 for an input of the first channel coding, the first information block and the first check bit block are interleaved to generate the first bit block, and the first information block is used by N1 to generate the first check bit block; the output of the first channel coding is used by N1 to generate the first radio signal; the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block; the first radio signal is used by U2 for the input of the first channel decoding; and the first channel decoding corresponds to the first channel coding.

In one sub-embodiment, the M sub-information blocks are sequentially cascaded with the Q padding bits to generate a second information block, and the second information block is interleaved to generate the first information block.

In one sub-embodiment, the positions of the bits in the first sub-information block are continuous in the first bit block.

In one sub-embodiment, the positions of the Q padding bits are continuous in the first bit block.

In one sub-embodiment, the Q padding bits are Q bits whose positions are front-most in the first bit block.

In one sub-embodiment, the bits in the first sub-information block are Q bits whose positions are front-most in the first bit block.

In one sub-embodiment, the value of the first sub-information block is related to the information format of the first information block.

In one sub-embodiment, the value of the first sub-information block is related to the Q.

In one sub-embodiment, the bits in the first bit block are sequentially arranged in an ascending order of reliability coefficients corresponding to the subchannels of the polar code.

The above sub-embodiments may be arbitrarily combined without conflict.

Embodiment 6

Figure 6:
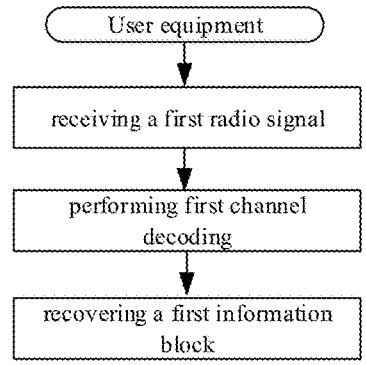
FIG. 6 is a flow chart illustrating a first radio signal, first channel decoding and a first information block according to an embodiment of the present disclosure.

Embodiment 6 is a flow chart illustrating a first radio signal, first channel decoding and a first information block according to an embodiment of the present disclosure. In FIG. 6, each block represents a step.

In Embodiment 6, the user equipment in the present disclosure sequentially receives the first radio signal, performs first channel decoding, and recovers the first information block; the first radio signal is used for an input of first channel decoding, the first channel decoding corresponds to first channel coding, the first channel coding is based on a polar code, and a first bit block is used for an input of the first channel coding; the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer; the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the first channel decoding is serial channel decoding.

In one embodiment, a Successive Cancellation List (SCL) is used in the first channel decoding to decode the polar code.

In one embodiment, the polar code refers to using the result of multiplying an input bit block of length N by a Kronecker matrix having N rows and N columns as an output of a polar code, the input bit block includes the bits in the first information block, and the bits in the first check bit block and frozen bits.

In one embodiment, the first bit block does not include frozen bits, and one frozen bit block and the first bit block are sequentially cascaded to generate a fourth bit block.

In one embodiment, the bits in the fourth bit block are arranged in an ascending order of reliability coefficients corresponding to the subchannels.

The positions of the bits in the fourth bit block are in one-to-one correspondence with N reliability coefficients, respectively, the N reliability coefficients are in one-to-one correspondence with the sequence numbers of the N subchannels, respectively, the bits in the fourth bit block are placed on the subchannel corresponding to their position, and the bits on the N subchannels are arranged in an ascending order of the sequence numbers of the N subchannels to form the fifth bit block.

In one embodiment, the fifth bit block is used as an input of the polar code.

In one embodiment, the first information block is a DCI block.

In one embodiment, a PDCCH is used to transmit the first information block.

In one embodiment, the first sub-information block indicates an information format of the first information block, and the information format of the first information block is used to determine the value of Q.

In one embodiment, the decoding result for the first sub-information block is used to determine the value of Q and the positions of the Q padding bits, and the Q padding bits are used as frozen bits in a subsequent decoding process.

In one embodiment, the sequential order in which the bits in the first information block are in the first information block is different from the sequential order in which the bits in the first information block are in the first bit block.

In one embodiment, the first information block and the first check bit block are sequentially cascaded to generate a third bit block, and the first interleaving table is used to interleave the third bit block to generate the first bit block.

In one embodiment, the first interleaving table includes an index column and a numerical column, the index column includes continuous index values that are in one-to-one correspondence with values in the numerical column, the index values are used to sequentially generate bits in the first bit block, the values in the first value set in the numerical column are in one-to-one association with bit positions in the third bit block, and the values in the numerical column are arranged in an ascending order of its corresponding index values.

In one embodiment, the first sub-information block consists of 2 bits.

In one embodiment, the first sub-information block consists of 3 bits.

In one embodiment, the first sub-information block consists of 4 bits.

In one embodiment, the first channel coding includes rate matching.

In one embodiment, the output of the polar code is used as an input of rate matching.

In one embodiment, the output of the first channel coding is an output after rate matching.

Embodiment 7

Figure 7:
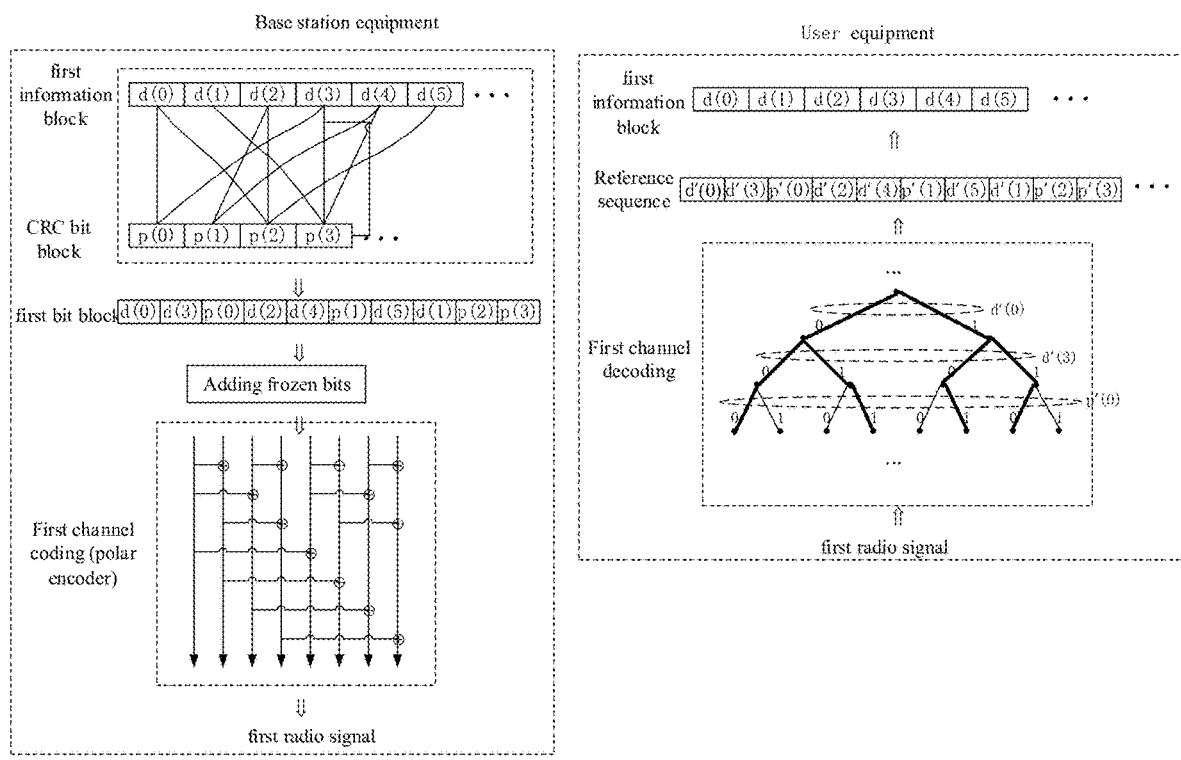
FIG. 7 is a schematic diagram illustrating first channel coding and first channel decoding according to an embodiment of the present disclosure.

Embodiment 7 illustrates first channel coding and first channel decoding, as shown in FIG. 7.

In Embodiment 7, in the base station equipment, the bits $d(1)\ d(2)\ d(3)\ d(4)\ d(5)\ldots$ in the first information block are used to generate bits in the CRC bit blocks $p(1)\ p(2)\ d(3)\ldots$, the bits in the first information block and the CRC bit block are interleaved to obtain a first bit block, the first bit block is used as an input of first channel coding after adding frozen bits, the output of the channel coding is used to generate the first radio signal, and the channel coding is based on a polar code. At least a portion of the bits in the CRC bit block are distributed (i.e., discontinuous) in the first bit block.

In the user equipment, the received first radio signal is used to generate an input of the first channel decoding, and the first channel decoding is based on the first channel coding. The output of the first channel decoding is a reference sequence, and the reference sequence and the bits in the first bit block are in one-to-one correspondence.

In FIG. 7, the bits in the first information block are represented by $d(i)$, where i is an integer greater than or equal to 0; the bits in the CRC bit block are represented by $p(j)$, where j is an integer greater than or equal to 0. The bits in the first information block and the associated bits in the CRC bit block are connected by a solid line. The tree diagram in the decoder represents a portion of the path associated with the bits $\{d(0), d(3), p(0)\}$ in the channel decoding, and the position of the bits $\{d(0), d(3), p(0)\}$ in the first bit block is continuous.

In one embodiment, the first channel decoding is based on Viterbi criteria, and the reference value corresponding to at least one CRC bit is used for pruning in the first channel decoding.

In one embodiment, the CRC bit block includes 24 bits, in which 8 bits are discontinuous.

In one embodiment, the first information block includes bits in the first sub-information block, the first bit block includes Q padding bits, where the Q is a positive integer; in the first channel decoding, the user equipment determines an element corresponding to bits in the first sub-information block in the reference sequence first before obtaining an element corresponding to Q1 padding bits in the reference sequence, determines a value of the Q1 padding bits according to the element corresponding to bits in the first sub-information block in the reference sequence, and performs a subsequent decoding operation using the Q1 padding bits as frozen bits, where the Q1 padding bits are a subset of the Q padding bits.

In one embodiment, the Q1 is equal to the Q.

In one embodiment, the Q1 is smaller than the Q, and the padding bits in the Q padding bits other than the Q1 padding bits are decoded prior to the first sub-information block.

In one embodiment, the value of each element in the reference sequence is a Log Likelihood Ratio (LLR) estimated for the corresponding (transmitted) bits.

In one embodiment, an element corresponding to the Q1 padding bits in the reference sequence is 0; the value of each element in the reference sequence is a Log Likelihood Ratio (LLR) estimated for the corresponding (transmitted) bits, except the element corresponding to the Q1 padding bits.

In one embodiment, the first radio signal is an output subsequently to being subjected to scrambling, a modulation mapper, a layer mapper, precoding, resource element mapper, and wideband symbol generation sequentially after the first bit block is added with frozen bits.

In one embodiment, the first radio signal is an output subsequently to being subjected to scrambling, a modulation mapper, a layer mapper, a transform precoder (which is configured to generate a complex value signal), precoding, resource element mapper, and wideband symbol generation sequentially after the first bit block is added with frozen bits.

In one embodiment, the CRC bit block is an output of the first information block subjected to a CRC cyclic generator polynomial.

In one embodiment, the CRC bit block is an output after the first information block is subjected to a CRC cyclic generator polynomial and scrambling.

In one embodiment, the polynomial formed by the first information block and the CRC bit block prior to scrambling can be divisible by the CRC cyclic generator polynomial on the $GF(2)$, that is, the remainder obtained by dividing the polynomial formed by the first information block and the CRC bit block prior to scrambling by the CRC cyclic generator polynomial is zero.

In one embodiment, the first channel coding includes rate matching.

In one embodiment, the pruning is used to reduce surviving search paths in the channel decoding based on Viterbi criteria. For example, in the tree diagram of FIG. 7, the paths indicated by thick solid lines are the surviving search paths, and the other paths are the search paths that are deleted.

In one embodiment, in the first bit block, bits in the first information block corresponding to the pruned search paths precede the associated CRC bits. For example, the reference value corresponding to $p(0)$ is denoted by $p'(0)$ in FIG. 7, and is used for pruning in the channel decoding. The bits corresponding to the pruned search paths are $d(0)$ and $d(3)$. The positions of $d(0)$ and $d(3)$ in the third bit block precede $p(0)$.

Embodiment 8

Figure 8:
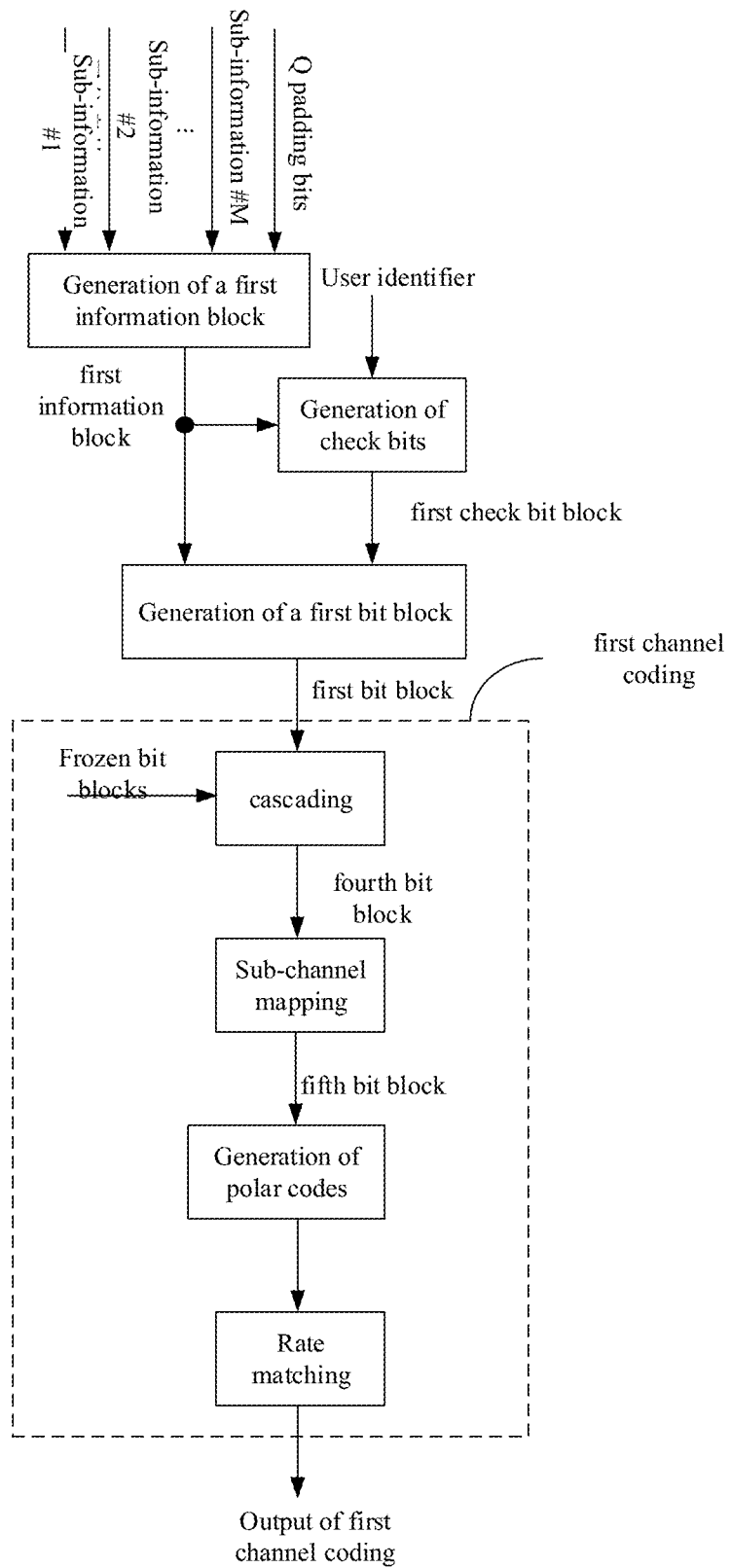
FIG. 8 is a schematic diagram illustrating first channel coding according to an embodiment of the present disclosure.

Embodiment 8 illustrates the first channel coding, as shown in FIG. 8.

In Embodiment 8, the first channel coding includes a cascading module, a subchannel mapping module, a polar code generating module, and a rate matching module. The first information block generating module, the check bit generating module, and the first bit block generating module are processing modules prior to the first channel coding.

In Embodiment 8, the first information block includes bits in M sub-information blocks and Q padding bits, and the M sub-information blocks are sub-information block #1, sub-information block #2, . . . sub-information block # M in FIG. 8, respectively. The first sub-information block is one of the M sub-information blocks. In the first information block generating module, the M sub-information blocks and the Q padding bits are used to form the first information block. In the check bit generating module, the first information block is used to generate a CRC bit block. The identifier corresponding to the user equipment is used to scramble the CRC bit block to generate the first check bit block. In the first bit block generating module, the first information block and the first check bit block are interleaved to generate a first bit block after being sequentially cascaded. In the cascading module, the frozen bit block and the first bit block are sequentially cascaded to generate the fourth bit block. The bits in the fourth bit block are arranged in an ascending order of reliability coefficients. The positions of the bits in the fourth bit block are in one-to-one correspondence with N reliability coefficients, respectively. In the subchannel mapping module, the N reliability coefficients are in one-to-one correspondence with the sequence numbers of the N subchannels, respectively, the bits in the fourth bit block are placed on the subchannel corresponding to their position, and the bits on the N subchannels are arranged in an ascending order of the sequence numbers of the N subchannels to form a fifth bit block. In the polar code generating module, the fifth bit block is multiplied by a Kronecker matrix having N rows and N columns used by the polar code to obtain the output of the polar code, where the N is the nth power of 2, and the n is a positive integer. In the rate matching module, the output of the polar code generating module is subject to rate matching.

In one embodiment, the first bit and the second bit are two bits in the first information block; the first sub-information block is one of the M sub-information blocks; both the first bit and the second bit belong to the first sub-information block, and there is at least one bit that does not belong to the first sub-information block locating between the positions of the first bit and the second bit in the first information block.

In one embodiment, the first bit and the second bit are two bits in the first information block; the first sub-information block is one of the M sub-information blocks; the first bit and the second bit belong to the Q padding bits, and there is at least one bit belonging to the M sub-information blocks locating between the positions of the first bit and the second bit in the first information block.

In one embodiment, the first sub-information block indicates an information format of the first information block, and the information format of the first information block is used to determine the value of Q.

In one embodiment, the bits in the first sub-information block are bits in the first bit block that are closest to the first check bit and precede the first check bit, and the first check bit is the bit in the first check bit block whose position is front-most in the first bit block.

In one embodiment, the first sub-information block consists of P bits, and the P bits are the P bits whose positions are front-most in the first bit block, where the P is a positive integer.

In one embodiment, the Q padding bits are the Q bits whose positions are front-most in the first bit block, where the Q is a positive integer.

In one embodiment, the first sub-information block consists of P bits, and the P bits are the P bits in the first information block whose positions are ranked last in the first bit block.

Embodiment 9

Figure 9:
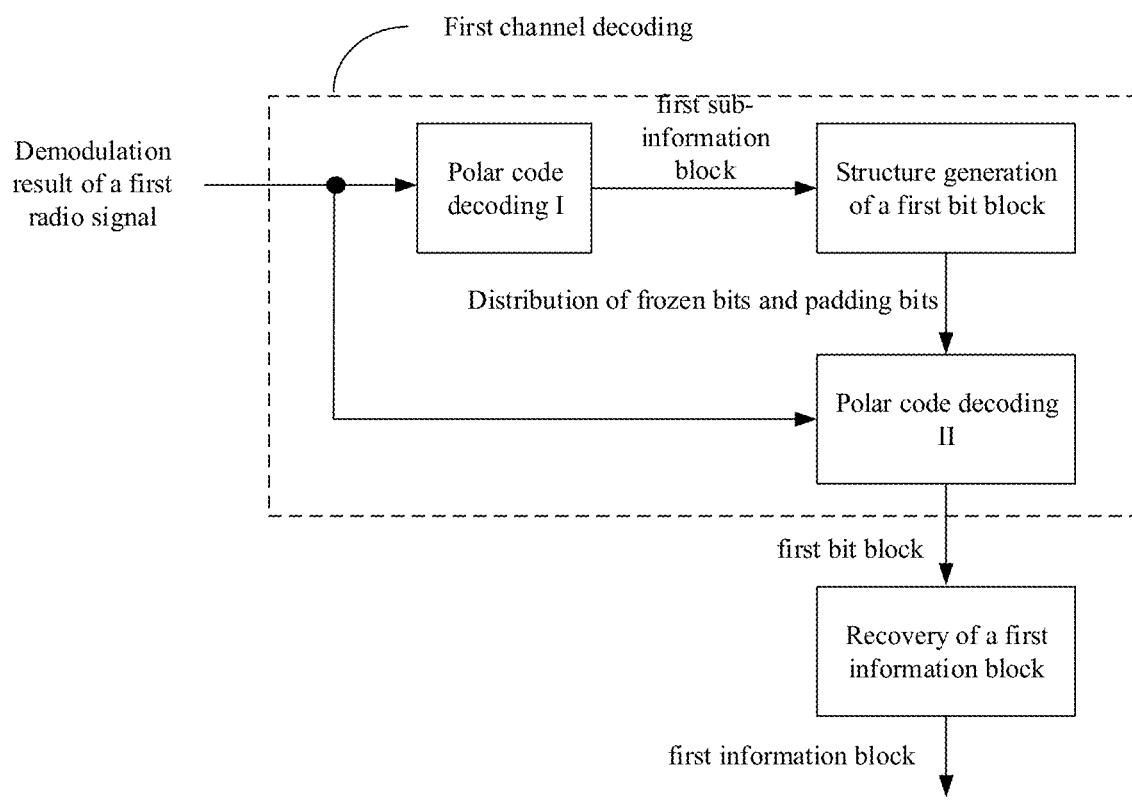
FIG. 9 is a schematic diagram illustrating first channel decoding according to one embodiment of the present disclosure.

Embodiment 9 illustrates the first channel decoding, as shown in FIG. 9.

In Embodiment 9, the first channel decoding includes a polar code decoding I module, a padding bit position determining module, and a polar code decoding II module. The output of the first channel decoding is a first bit block. The first information block recovering module is a processing module after the first channel decoding.

In Embodiment 9, the frozen bit block and the first bit block are cascaded and then are used by the transmitter to generate the first radio signal. The first bit block includes bits in the first information block and a first check bit block corresponding to the first information block. The first information block and the first check bit block are interleaved to generate the first bit block. The first information block consists of bits in M sub-information blocks and Q padding bits, where the M is a positive integer greater than one, and the Q is a non-negative positive integer. The first sub-information block is one of the M first sub-information blocks, the value of the first sub-information block indicates an information format of the first information block, and the information format of the first information block is used to determine the Q. The first sub-information block consists of P bits, where the P is a positive integer.

In Embodiment 9, in the polar code decoding I module, a demodulation result of the first radio signal is used to decode to obtain bits in the first sub-information block. In the padding position determining module, the value of the first sub-information block is used to determine the distribution of the Q padding bits in the first information block. In the polar code decoding II module, the distribution of the Q padding bits in the first information block is used to generate the first bit block. In the first information block recovering module, the first bit block is used to recover the first information block.

In Embodiment 9, the decoding in the polar code decoding I module and the polar code decoding II module is based on the Kronecker matrix used in the polar code used to generate the first radio signal. The serial decoding is used for the polar code decoding I module and the polar code decoding II module.

In one embodiment, a Successive Cancellation List (SCL) is used to decode the polar code in the polar code decoding I module and the polar code decoding II module.

In one embodiment, a Successive Cancellation Stack (SCS) is used to decode the polar code in the polar code decoding I module and the polar code decoding II module.

In one embodiment, the first bit and the second bit are two bits in the first information block; the first sub-information block is one of the M sub-information blocks; both the first bit and the second bit belong to the first sub-information block, and there is at least one bit that does not belong to the first sub-information block locating between the positions of the first bit and the second bit in the first information block.

In one embodiment, the first bit and the second bit are two bits in the first information block; the first sub-information block is one of the M sub-information blocks; the first bit and the second bit belong to the Q padding bits, and there is at least one bit belonging to the M sub-information blocks locating between the positions of the first bit and the second bit in the first information block.

Embodiment 10

Figure 10:
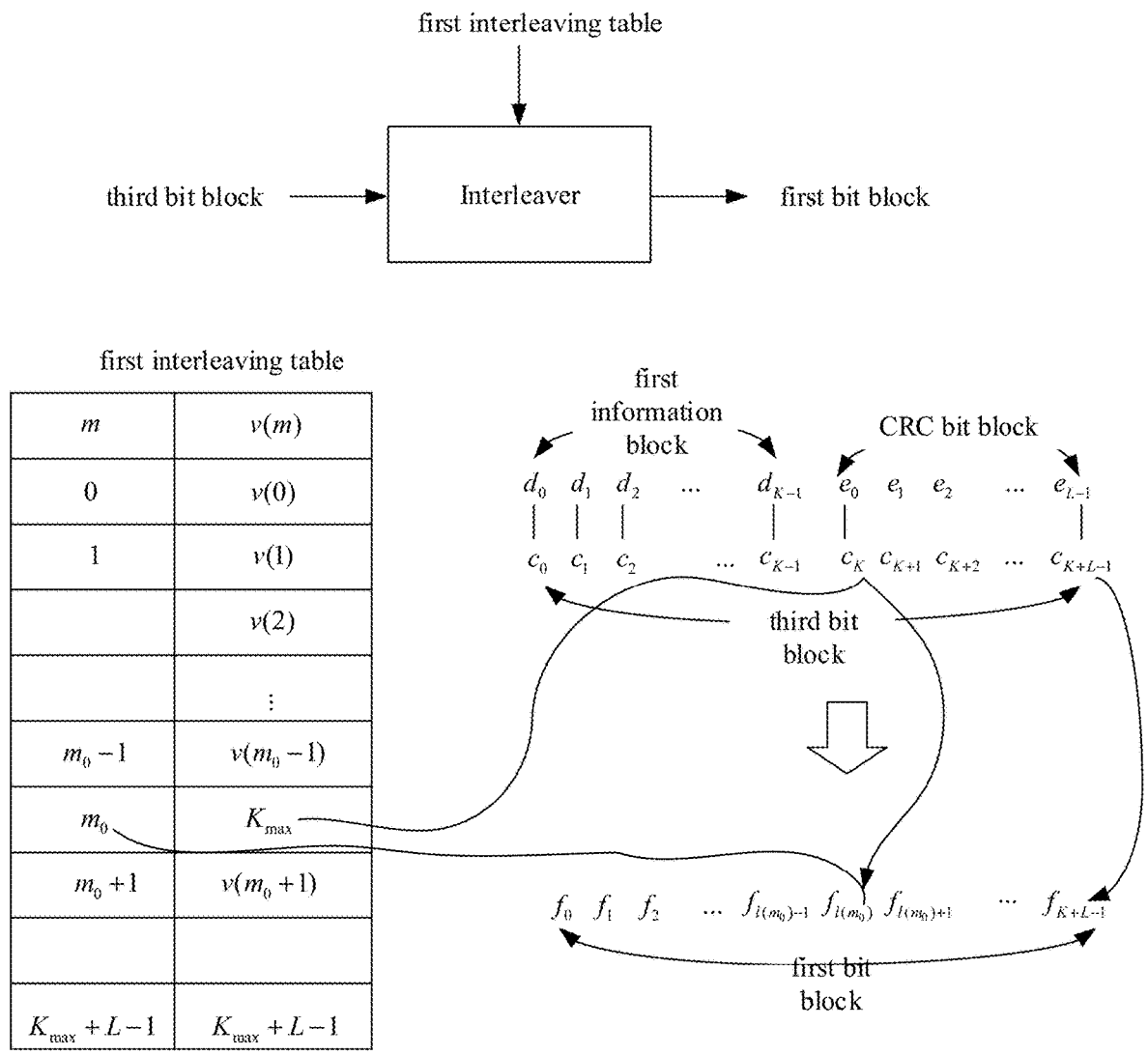
FIG. 10 is a schematic diagram illustrating interleaving a first information block and a first check bit block according to an embodiment of the present disclosure.

Embodiment 10 illustrates interleaving a first information block and a first check bit block, as shown in FIG. 10.

In Embodiment 10, the third bit block and the first interleaving table are used as an input of the interleaver module, and the output of the interleaver module is a first bit block consisting of K+L bits $f_0, f_1, \ldots, f_{K+L-1}$. The first information block is formed by cascading K bits $d_0, d_1, \ldots, d_{K-1}$, the first check bit block is formed by cascading L check bits $e_0, e_1, \ldots, e_{L-1}$, and the third bit block $c_0, c_1, \ldots, c_{K+L-1}$ is formed by sequentially cascading the first information block and the first check bit block. The first bit block does not include frozen bits.

In Embodiment 10, the first interleaving table includes an index column (i.e., a column in which m is located) and a numerical column (i.e., a column in which v(m) is located), the index column includes continuous index values that are in one-to-one correspondence with values in the numerical column, the index values are used to sequentially generate bits in the first bit block, the values in the first value set in the numerical column are in one-to-one association with bit positions in the third bit block, and the values in the numerical column are arranged in an ascending order of its corresponding index values. The number of index values included in the first interleaving table is equal to a maximum possible value $K_{max}+L$ of the number of bits in the third bit block, where $K_{max}$ is the maximum possible value of the number of bits in the first information block.

In Embodiment 10, when $K=K_{max}$, the bits with the sequence number equal to v(m) in the third bit block are placed in the bit position with the sequence number equal to m in the first bit block; when $K<K_{max}$, the bit with the sequence number equal to $v(m)-(K_{max}-K)$ in the third bit block are sequentially placed in the first bit block in an ascending order of m corresponding to v(m), where v(m) needs to meet the condition $v(m) \geq K_{max}-K$, and the values of $v(m)<K_{max}-K$ in the numerical column are not used to interleave the bits in the third bit block.

In Embodiment 10, the first check bit is a bit which is ranked front-most in the third bit block among the L check bits. The first check bit is also a bit which is ranked front-most in the first bit block among the L check bits. The corresponding value of the first check bit in the first interleaving table is $K_{max}$. The index value corresponding to the value $K_{max}$ is $m_0$. The corresponding sequence number of the $m_0$ in the first bit block is $l(m_0)$, which depends on the value of the K. The previous adjacent bit and the next adjacent bit of the first check bit in the first bit block are bits in the first information block.

In one embodiment, the positions of the at least two check bits among the L check bits in the first bit block are discontinuous.

In one embodiment, the value of any one of the L check bits is unrelated to the bits whose position is subsequent to the check bit among the first bit block in the first information block.

In one embodiment, the value of any one of the L check bits can only be related to the bits whose position is prior to the check bit among the first bit block in the first information block, without being related to the bits whose position is subsequent to the check bit among the first bit block in the first information block.

In one embodiment, the value of any one of the L check bits is only related to the bits whose position is prior to the check bit among the first bit block in the first information block.

Embodiment 11

Figure 11:
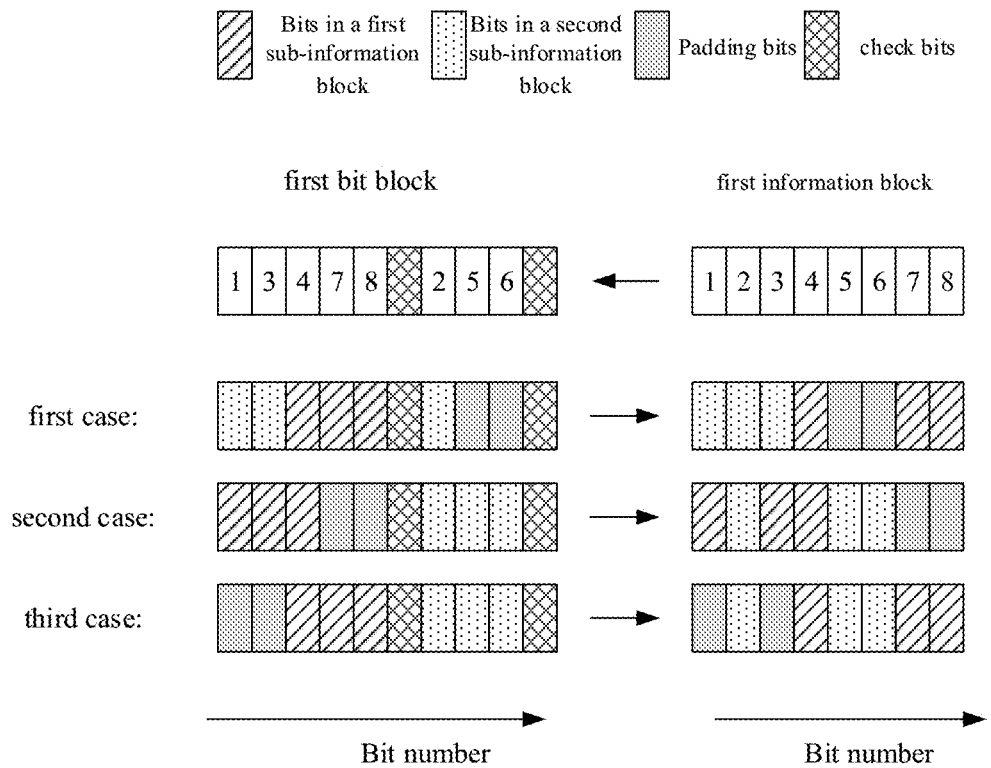
FIG. 11 is a schematic diagram illustrating the distribution of a first sub-information block and padding bits in a first information block and a first bit block according to an embodiment of the present disclosure.

Embodiment 11 illustrates the distribution of the first sub-information block and the padding bits in the first information block and the first bit block, as shown in FIG. 11. In FIG. 11, the squares filled with oblique lines are the bits in the first sub-information block, the squares filled with dots are the bits in the second sub-information block, squares filled with gray are padding bits, and squares filled with crosses are the check bits in the first check bit block.

In Embodiment 11, the first information block consists of 3 bits in the first sub-information block, 3 bits in the second sub-information block, and 2 padding bits. The first information block is used to generate a first check bit block. The check bits in the first check bit block are used to check whether the first information block is received and decoded correctly. The first information block and the first check bit block are interleaved to generate a first bit block. The first check bit block includes 2 check bits. The first check bit is the bit in the two check bits whose position is front-most in the first bit block.

In Embodiment 11, the first information block includes 8 bits arranged sequentially, and the 8 bits and the 2 check bits are interleaved according to the rule shown in FIG. 11 to generate a first bit block.

FIG. 11 illustrates three cases in which the first sub-information block and the two padding bits are distributed in the first information block and the first bit block.

In the first case, the bits in the first sub-information block are the 3 bits in the first bit block that is closest to the first check bit prior to the first check bit, and the two padding bits are the 2 bits whose positions are ranked last in the first bit block among the bits of the first information block. Therefore, in the first information block, the bits in the first sub-information block are discontinuous, and the two padding bits exist between the two bits in the first sub-information block.

In one embodiment, the bits in the first bit block are arranged in an ascending order of the reliability of the corresponding subchannels, and the first check bit is used to check information bits whose positions are prior to the first check bit in the first bit block.

In one embodiment, the bits in the first bit block corresponding to the 2 bits in the first sub-information block are the 2 bits that can be checked by the first check bit and have the highest reliability in the first bit block.

In the second case, the bits in the first sub-block are the top 3 bits in the first bit block, and the 2 padding bits are the 2 bits whose positions are ranked last in the first information block. Therefore, in the first information block, the bits in the first sub-information block are discontinuous, and the bits in the second sub-information block exist between the two bits in the first sub-information block.

In one embodiment, the bits in the first bit block are arranged chronologically in a coding order, and the bits in the first sub-information block correspond to the bits decoded earliest.

In the third case, the 2 padding bits are the top 2 bits in the first bit block, and the bits in the first sub-information block precede the first check bit. Therefore, in the first information block, the two padding bits are discontinuous, and the bits in the first sub-information block exist between the two padding bits. The bits in the first sub-information block are also discontinuous, and two bits in the second sub-information block exist between two bits in the first sub-information block.

In one embodiment, the frozen bit block and the first bit block are sequentially cascaded to generate a fourth bit block. The 2 padding bits are 2 bits closest to the frozen bit block. The bits in the fourth bit block are arranged in an ascending order of reliability.

In one embodiment, the bits in the first bit block are arranged in an ascending order of the reliability of the corresponding subchannels, and the 2 padding bits are the 2 bits with the lowest reliability in the first bit block.

In one embodiment, the first bit block is used to generate a polar code.

In one embodiment, the fourth bit block is used to generate a polar code.

In one embodiment, the bits in the fourth bit block are placed on subchannels which are in one-to-one correspondence with each other.

Embodiment 12

Figure 12:
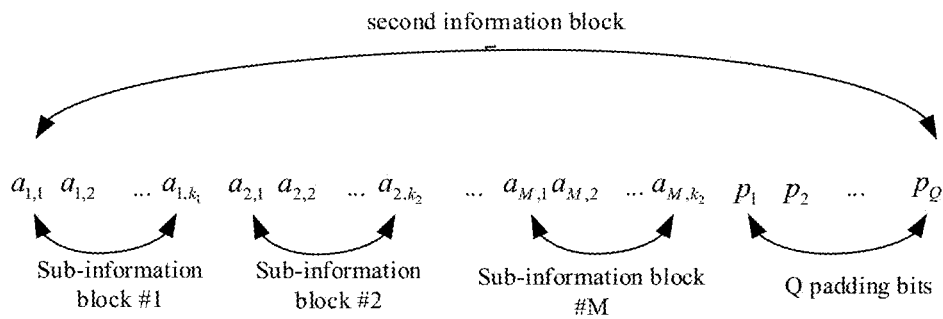
FIG. 12 is a schematic diagram illustrating a first information block and a second information block according to an embodiment of the present disclosure.
Figure 12:
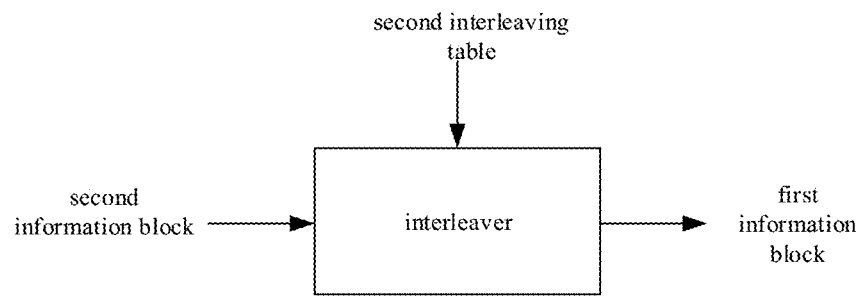

Embodiment 12 illustrates a first information block and a second information block, as shown in FIG. 12.

In Embodiment 12, the M sub-information blocks are sequentially cascaded with the Q padding bits to generate a second information block, where the M is a positive integer greater than one, and the Q is a non-negative positive integer. In the interleaver module, a second interleaving table is used to interleave the second information block to generate the first information block. The first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the second information block is a DCI.

In one embodiment, the length of the second interleaving table is related to the number of bits in the first information block.

In one embodiment, if the number of bits in the first information block is Q1, the second interleaving table is used to interleave the second information block to generate the first information block; if the number of bits in the first information block is Q2, the third interleaving table is used to interleave the second information block to generate the first information block; where the Q1 and the Q2 are two different positive integers, and the second interleaving table and the third interleaving table are two different interleaving tables.

In one embodiment, the meaning of at least one of the M sub-information blocks is related to the number of bits in the second information block.

In one embodiment, the M is related to the number of bits in the second information block.

In one embodiment, the first information block is a DCI, and the M sub-information blocks correspond to M fields in the DCI, respectively.

In one embodiment, the first sub-information block is the sub-information block #1.

In one embodiment, the first sub-information block is the sub-information block # M.

In one embodiment, the meaning of the M sub-information blocks is related to the DCI format corresponding to the second information block.

In one embodiment, the M fields include one or more of the following fields:
Resource Allocation;
Modulation coding Status (MCS);
Carrier Indicator Field (CIF);
Transmission Power Control (TPC);
Hybrid Automatic Repeat Request (HARQ) Process Number;
Redundancy Version (RV);
New Data Indicator (NDI);
Bandwidth Part (BWP) indication;
Sounding Reference Signal Resource Indicator (SRI);
Transmission Precoding Matrix Indicator (TPMI);
Aperiodic Channel Status Information (A-CSI) trigger;
Aperiodic Sounding Reference Signal (A-SRS) trigger;
Demodulation Reference Signal (DMRS) configuration information.

Embodiment 13

Figure 13:
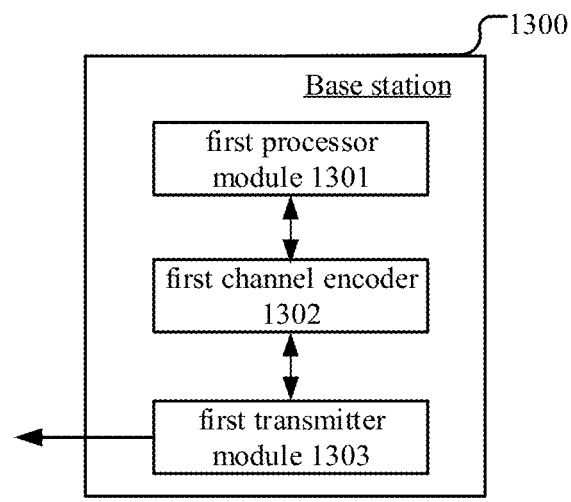
FIG. 13 is a block diagram illustrating the structure of a processing device in a base station according to an embodiment of the present disclosure.

Embodiment 13 is a block diagram illustrating the structure of a processing device in a base station, as shown in FIG. 13. In FIG. 13, the base station processing device 1301 mainly consists of a first processor module 1301, a first channel encoder 1302, and a first transmitter module 1303.

In Embodiment 13, the first processor module 1301 generates a first information block; the first channel encoder 1302 performs first channel coding; and the first transmitter module 1303 transmits a first radio signal.

In Embodiment 13, the first information block consists of bits in M sub-information blocks and Q padding bits, where the M is a positive integer greater than one, and the Q is a non-negative positive integer; the first channel coding is based on a polar code, a first bit block is used for an input of the first channel coding, the first information block and the first check bit block are interleaved to generate the first bit block, and the first information block is used to generate the first check bit block; the output of the first channel coding is used to generate the first radio signal; the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the M sub-information blocks are sequentially cascaded with the Q padding bits to generate a second information block, and the second information block is interleaved to generate the first information block.

In one embodiment, the positions of the bits in the first sub-information block are continuous in the first bit block.

In one embodiment, the positions of the Q padding bits are continuous in the first bit block.

In one embodiment, the Q padding bits are Q bits whose positions are front-most in the first bit block.

In one embodiment, the bits in the first sub-information block are Q bits whose positions are front-most in the first bit block.

In one embodiment, the value of the first sub-information block is related to the information format of the first information block, or the value of the first sub-information block is related to the Q.

In one embodiment, the bits in the first bit block are sequentially arranged in an ascending order of reliability coefficients corresponding to the subchannels of the polar code.

In one embodiment, the first processor module 1301 includes the controller/processor 440 in Embodiment 4.

In one embodiment, the first processor module 1301 includes the transmitting processor 415 in Embodiment 4.

In one embodiment, the first channel encoder 1302 includes the transmitting processor 415 in Embodiment 4.

In one embodiment, the first channel encoder 1302 includes the controller/processor 440 in Embodiment 4.

In one embodiment, the first transmitter module 1303 includes the MIMO transmitting processor 441 in Embodiment 4.

In one embodiment, the first transmitter module 1303 includes the transmitter/receiver 416 and the antenna 420 in Embodiment 4.

Embodiment 14

Figure 14:
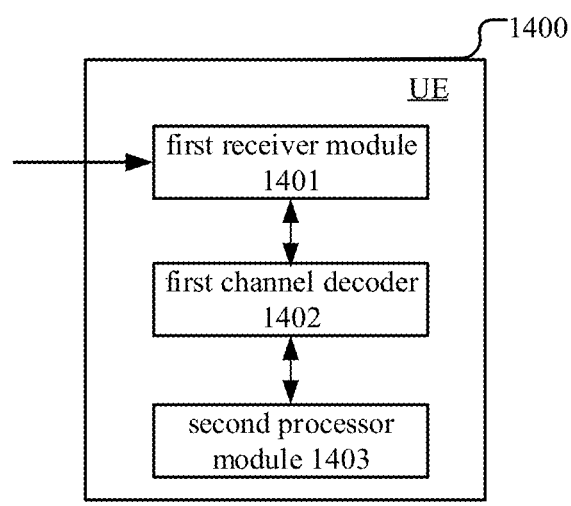
FIG. 14 is a block diagram illustrating the structure of a processing device in UE according to an embodiment of the present disclosure.

Embodiment 14 is a block diagram illustrating the structure of a processing device in UE, as shown in FIG. 14. In FIG. 14, the UE processing device 1400 mainly consists of a first receiver module 1401, a first channel decoder 1402, and a second processor module 1403.

In Embodiment 14, the first receiver module 1401 receives the first radio signal, the first channel decoder 1402 performs the first channel decoding, and the second processor module 1403 recovers the first information block.

In Embodiment 14, the first radio signal is used for an input of first channel decoding, the first channel decoding corresponds to the first channel coding, the first channel coding is based on a polar code, and a first bit block is used for an input of the first channel coding; the first information block consists of bits in M sub-information blocks and Q padding bits, the first information block is used to generate the first check bit block, and the first information block and the first check bit block are interleaved to generate the first bit block, where the M is a positive integer greater than one, and the Q is a non-negative positive integer; the first bit and the second bit are two bits in the first information block; the first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block.

In one embodiment, the M sub-information blocks are sequentially cascaded with the Q padding bits to generate a second information block, and the second information block is interleaved to generate the first information block.

In one embodiment, the positions of the bits in the first sub-information block are continuous in the first bit block.

In one embodiment, the positions of the Q padding bits are continuous in the first bit block.

In one embodiment, the Q padding bits are Q bits whose positions are front-most in the first bit block.

In one embodiment, the bits in the first sub-information block are Q bits whose positions are front-most in the first bit block.

In one embodiment, the value of the first sub-information block is related to the information format of the first information block, or the value of the first sub-information block is related to the Q.

In one embodiment, the bits in the first bit block are sequentially arranged in an ascending order of reliability coefficients corresponding to the subchannels of the polar code.

In one embodiment, the second processor module 1403 includes the controller/processor 490 in Embodiment 4.

In one embodiment, the second processor module 1403 includes the memory 480 in Embodiment 4.

In one embodiment, the second processor module 1403 includes the receiving processor 452 in Embodiment 4.

In one embodiment, the first channel decoder 1402 includes the receiving processor 452 in Embodiment 4.

In one embodiment, the first channel decoder 1402 includes the controller/processor 490 in Embodiment 4.

In one embodiment, the first receiver module 1401 includes the MIMO detector 472 in Embodiment 4.

In one embodiment, the first receiver module 1401 includes the transmitter/receiver 456 and the antenna 460 in Embodiment 4.

The ordinary skill in the art may understand that all or part steps in the above method may be implemented by instructing related hardware through a program. The program may be stored in a computer-readable storage medium, for example Read-Only Memory (ROM), hard disk or compact disc, etc. Preferably, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to mobile phones, unmanned aerial vehicles with a communication module, aircrafts with a communication module, cars with a communication module, tablet computers, notebooks, network cards, narrowband Internet of Things (NB-IOT) terminals, eMTC terminals, and other wireless communication devices. The base station or system equipment in the present disclosure includes but not limited to gNB, macro-cellular base stations, micro-cellular base stations, home base stations, relay base stations, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for use in a base station equipment for wireless communication, comprising:
    generating a first information block, wherein the first information block consists of bits in M sub-information blocks and Q padding bits, where the M is a positive integer greater than one, and the Q is a non-negative positive integer;
    performing first channel coding, wherein the first channel coding is based on a polar code, a first bit block is used for an input of the first channel coding, the first information block and the first check bit block are interleaved to generate the first bit block, and the first information block is used to generate the first check bit block; and
    transmitting a first radio signal, wherein the output of the first channel coding is used to generate the first radio signal;
    wherein a first bit and a second bit are two bits in the first information block;
    a first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block; and
    wherein the M sub-information blocks are sequentially cascaded with the Q padding bits to generate a second information block, and the second information block is interleaved to generate the first information block.

2. The method according to claim 1, wherein the positions of the bits in the first sub-information block are continuous in the first bit block.

3. The method according to claim 1, wherein the positions of the Q padding bits are continuous in the first bit block.

4. The method according to claim 1, wherein the Q padding bits are Q bits whose positions are front-most in the first bit block; or the bits in the first sub-information block are Q bits whose positions are front-most in the first bit block; or the value of the first sub-information block is related to the information format of the first information block, or the value of the first sub-information block is related to the value of Q; or the bits in the first bit block are sequentially arranged in an ascending order of reliability coefficients corresponding to the subchannels of the polar code.

5. A method for use in a user equipment for wireless communication, comprising:
    receiving a first radio signal;
    performing first channel decoding, wherein the first radio signal is used for an input of the first channel decoding, the first channel decoding corresponds to a first channel coding, the first channel coding is based on a polar code, and a first bit block is used for an input of the first channel coding; and
    recovering a first information block, wherein the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer;
    wherein a first bit and a second bit are two bits in the first information block;
    a first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block; and
    the M sub-information blocks are sequentially cascaded with the Q padding bits to generate a second information block, and the second information block is interleaved to generate the first information block.

6. The method according to claim 5, wherein the positions of the bits in the first sub-information block are continuous in the first bit block.

7. The method according to claim 5, wherein the positions of the Q padding bits are continuous in the first bit block.

8. The method according to claim 5, wherein the Q padding bits are Q bits whose positions are front-most in the first bit block; or the bits in the first sub-information block are Q bits whose positions are front-most in the first bit block; or the value of the first sub-information block is related to the information format of the first information block, or the value of the first sub-information block is related to the value of Q; or the bits in the first bit block are sequentially arranged in an ascending order of reliability coefficients corresponding to the subchannels of the polar code.

9. A base station equipment for wireless communication, comprising:
    a first processor configured to generate a first information block, wherein the first information block consists of bits in M sub-information blocks and Q padding bits, where the M is a positive integer greater than one, and the Q is a non-negative positive integer;
    a first channel encoder configured to perform first channel coding, wherein the first channel coding is based on a polar code, a first bit block is used for an input of the first channel coding, the first information block and the first check bit block are interleaved to generate the first bit block, and the first information block is used to generate the first check bit block; and
    a first transmitter module configured to transmit a first radio signal, wherein the output of the first channel coding is used to generate the first radio signal;
    wherein a first bit and a second bit are two bits in the first information block;
    a first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block; and
    wherein the M sub-information blocks are sequentially cascaded with the Q padding bits to generate a second information block, and the second information block is interleaved to generate the first information block.

10. The base station equipment according to claim 9, wherein the positions of the bits in the first sub-information block are continuous in the first bit block.

11. The base station equipment according to claim 9, wherein the positions of the Q padding bits are continuous in the first bit block.

12. The base station equipment according to claim 9, wherein the Q padding bits are Q bits whose positions are front-most in the first bit block; or the bits in the first sub-information block are Q bits whose positions are front-most in the first bit block; or the value of the first sub-information block is related to the information format of the first information block, or the value of the first sub-information block is related to value of Q; or the bits in the first bit block are sequentially arranged in an ascending order of reliability coefficients corresponding to the subchannels of the polar code.

13. A user equipment for wireless communication, comprising:
 a first receiver module configured to receive a first radio signal;
 a first channel decoder configured to perform first channel decoding, wherein the first radio signal is used for an input of the first channel decoding, the first channel decoding corresponds to the first channel coding, the first channel coding is based on a polar code, and a first bit block is used for an input of the first channel coding; and
 a second processor configured to recover a first information block, wherein the first information block consists of bits in M sub-information blocks and Q padding bits, the first information block is used to generate a first check bit block, and the first information block and the first check bit block are interleaved to generate the first bit block, where the M is a positive integer greater than one, and the Q is a non-negative positive integer;
 wherein a first bit and a second bit are two bits in the first information block;
 a first sub-information block is one of the M sub-information blocks; both the first bit and the second bit belong to the first sub-information block, there is at least one bit that does not belong to the first sub-information block locating between the positions of the first bit and the second bit in the first information block, or the first bit and the second bit belong to the Q padding bits, and there is at least one bit belonging to the M sub-information blocks locating between the positions of the first bit and the second bit in the first information block; and
 wherein the M sub-information blocks are sequentially cascaded with the Q padding bits to generate a second information block, and the second information block is interleaved to generate the first information block.

14. The user equipment according to claim 13, wherein the positions of the bits in the first sub-information block are continuous in the first bit block.

15. The user equipment according to claim 13, wherein the positions of the Q padding bits are continuous in the first bit block.

16. The user equipment according to claim 13, wherein the Q padding bits are Q bits whose positions are front-most in the first bit block; or the bits in the first sub-information block are Q bits whose positions are front-most in the first bit block; or the value of the first sub-information block is related to the information format of the first information block, or the value of the first sub-information block is related to the value of Q; or the bits in the first bit block are sequentially arranged in an ascending order of reliability coefficients corresponding to the subchannels of the polar code.

* * * * *